US012795203B2

(12) United States Patent
A N

(10) Patent No.: US 12,795,203 B2
(45) Date of Patent: Nov. 10, 2026

(54) CUSTOM NEWS FEED SYSTEMS AND METHODS

(71) Applicant: DISH Network Technologies India Private Limited, Bangalore (IN)

(72) Inventor: Srinidhi A N, Shivamogga (IN)

(73) Assignee: DISH Network Technologies India Private Limited (IN)

( * ) Notice: Subject to any disclaimer, the term of this patent is extended or adjusted under 35 U.S.C. 154(b) by 45 days.

(21) Appl. No.: 18/901,938

(22) Filed: Sep. 30, 2024

(65) Prior Publication Data

US 2026/0095627 A1 Apr. 2, 2026

(51) Int. Cl.

| | |
|---|---|
| ***H04N 21/466*** | (2011.01) |
| ***H04N 21/41*** | (2011.01) |
| ***H04N 21/43*** | (2011.01) |

(52) U.S. Cl.

CPC ..... *H04N 21/4668* (2013.01); *H04N 21/4108* (2013.01); *H04N 21/43079* (2020.08)

(58) Field of Classification Search

CPC ........... H04N 21/4668; H04N 21/4108; H04N 21/43079; H04N 21/4532; H04N 21/4312; H04N 21/4622; H04N 21/4316; H04N 21/25891; H04N 21/4825; H04N 21/23424; H04N 21/44224; H04N 21/8549; H04N 21/4666; H04N 21/4662; H04N 21/26258; H04N 21/458; H04N 21/2187; H04N 21/44008; G06N 20/00

USPC .......................................................... 725/46

See application file for complete search history.

(56) References Cited

U.S. PATENT DOCUMENTS

| | | | | |
|---|---|---|---|---|
| 11,113,453 | B1 * | 9/2021 | Douglas | G06F 3/011 |
| 2003/0004961 | A1 * | 1/2003 | Slothouber | H04N 21/2402 |
| 2006/0206568 | A1 * | 9/2006 | Verma | H04W 4/029 709/206 |
| 2017/0185912 | A1 * | 6/2017 | Friggeri | H04L 67/55 |
| 2018/0336282 | A1 * | 11/2018 | Pandey | G06F 16/9535 |
| 2021/0004790 | A1 * | 1/2021 | Di Iorio | G06Q 20/223 |
| 2021/0073858 | A1 * | 3/2021 | Sokolov | G06Q 30/0255 |
| 2021/0084350 | A1 * | 3/2021 | Chandra | H04N 21/26258 |
| 2021/0367800 | A1 * | 11/2021 | Davuluri | G10L 15/26 |
| 2022/0184454 | A1 * | 6/2022 | Powers | A63B 24/0062 |
| 2022/0374482 | A1 * | 11/2022 | G Rao | G06F 16/9535 |
| 2023/0161966 | A1 * | 5/2023 | Tunstall-Pedoe | G06F 16/3329 704/9 |
| 2024/0135114 | A1 * | 4/2024 | Krapf | G06F 40/56 |

(Continued)

FOREIGN PATENT DOCUMENTS

JP 2026030668 A * 2/2026

*Primary Examiner* — Cynthia M Fogg

(74) *Attorney, Agent, or Firm* — Kipman T. Werking; Frontier IP Law PLLC

(57) ABSTRACT

A disclosed method may include applying, by a television content provider, an artificial intelligence news feed customization model to preferences that a client of the television content provider reveals as indicated by an artificial intelligence preferences model that is monitoring behavior of the client such that a customized news feed is generated based on news content that was extracted from output of multiple news application programming interfaces (APIs) and a new customized news feed is generated that is tailored to the preferences of the client of the television content provider as indicated by the artificial intelligence preferences model.

20 Claims, 11 Drawing Sheets

(56) References Cited

U.S. PATENT DOCUMENTS

| | | | | |
|---|---|---|---|---|
| 2024/0211682 | A1* | 6/2024 | De | G06F 40/166 |
| 2024/0273572 | A1* | 8/2024 | Chai | G06Q 30/0242 |
| 2025/0077568 | A1* | 3/2025 | Chakiat | G06Q 10/40 |

* cited by examiner

CUSTOM NEWS FEED SYSTEMS AND METHODS

BRIEF SUMMARY

This disclosure is generally directed to systems, methods, and computer-readable media relating to a custom news feed. In modern society, access to information has become ubiquitous, with news and updates available from countless sources at any given moment. This abundance of information, while potentially beneficial, often leads to a state of information overload for many individuals. Users may find themselves struggling to stay informed about topics that genuinely interest them without feeling overwhelmed by the sheer volume of content available. This challenge becomes particularly apparent in the context of television viewing, where users may desire to stay updated on important news without interrupting their primary viewing experience. The traditional methods of news delivery on television often fall short in addressing this complex issue, leaving users caught between the desire for information and the enjoyment of their chosen entertainment. These techniques for news delivery on television may create a dilemma for viewers who want to remain informed but also wish to fully engage with their selected programming. The lack of personalization in these methods means that viewers may be presented with information that is not relevant to their interests or needs, further exacerbating the feeling of information overload.

Some news delivery methods on television, such as news tickers or periodic news breaks, may be disruptive to the overall viewing experience. This disruption becomes especially problematic when the information presented may not be relevant or interesting to the specific viewer watching at that time. These techniques typically may not account for individual user preferences, instead presenting the same information to all viewers regardless of their personal interests or information needs. This one-size-fits-all technique may lead to decreased engagement with news content and may result in users missing out on information that would be valuable to them personally. The lack of customization in these systems means that viewers may need to sift through large amounts of irrelevant information to find the news that matters to them, which may be time-consuming and frustrating. Additionally, the format of traditional news delivery methods may not be optimal for all types of content or for all viewing situations, further limiting their effectiveness in keeping viewers informed while maintaining an enjoyable television experience.

Another limitation of related systems is their inability to efficiently aggregate and filter news from multiple sources. In today's media landscape, there is a proliferation of news outlets and online platforms, resulting in valuable information being spread across various channels and formats. Users often find it time-consuming and impractical to manually check multiple sources to stay informed on topics that matter to them. This fragmentation of information may lead to an incomplete understanding of current events or missed opportunities to engage with relevant content. The challenge of efficiently consolidating and presenting diverse news sources remains a significant hurdle for television news delivery systems. Without a comprehensive aggregation system, viewers may receive a biased or limited view of events, depending on the sources their chosen news delivery method prioritizes. This may lead to a narrowing of perspective and a less informed viewership, which is contrary to the goals of news dissemination and public awareness.

The rapid pace of news generation in the digital age presents additional challenges for news delivery methods. Important updates may occur at any time, and users may miss certain information if they are not actively seeking it out or if their preferred news sources are not immediately available. This issue becomes particularly problematic for time-sensitive news or emergency alerts that may be relevant to the user's location or interests. The inability of related systems to provide timely, personalized updates may leave users feeling out of touch or potentially uninformed about issues that directly affect them. In an era where information may have immediate and significant impacts on daily life, from severe weather warnings to public health advisories, the limitations of related news delivery systems become even more apparent. The delay between when news breaks and when it reaches viewers through related television methods may be substantial, potentially putting viewers at a disadvantage in situations where timely information is important.

Furthermore, related news delivery systems may lack the ability to adapt to changing user interests over time. An individual's preferences and priorities may evolve based on various factors such as life events, changing professional focus, or shifting personal interests. However, static news delivery methods may not account for these shifts, potentially leading to a decrease in engagement and relevance of the presented information. This lack of adaptability may diminish the user experience and may cause users to seek alternative sources for their news consumption, potentially missing out on the convenience and integration that television-based news delivery may offer. The inability to evolve with the user's changing interests means that these systems may become less useful over time, failing to provide the personalized and relevant information that users increasingly expect in other aspects of their digital lives. This static nature of news delivery may lead to a disconnect between the information provided and the user's current needs and interests, reducing the overall value of the news delivery service.

The challenge of balancing information delivery with entertainment value is another aspect that related systems struggle to address effectively. Television viewers often choose specific programs or content for entertainment purposes, and the intrusion of news updates, no matter how important, may be seen as an unwelcome interruption. This creates a dilemma for content providers and viewers alike regarding how to keep users informed without sacrificing the primary entertainment function of the television experience. Finding this balance may be helpful for maintaining user engagement and satisfaction while still fulfilling the role of information dissemination. The interruption of programming for news updates may lead to viewer frustration and may even result in users avoiding channels or services that frequently interrupt their viewing experience. On the other hand, a complete lack of news updates may leave viewers feeling disconnected from current events.

To address the above issues and others, in some examples, a method may include (i) applying, by a television content provider, an artificial intelligence news feed customization model to preferences that a client of the television content provider reveals as indicated by an artificial intelligence preferences model that is monitoring behavior of the client such that a customized news feed is generated based on news content that was extracted from output of multiple news application programming interfaces (APIs) and a new customized news feed is generated that is tailored to the preferences of the client of the television content provider as indicated by the artificial intelligence preferences model and (ii) transmitting, by the television content provider, the new customized news feed to a client device of the client of the television content provider such that a television of the client of the television content provider is enabled to output the new customized news feed as a pop-up display occupying a minority portion of screen space of a display of the television.

In some examples, the new customized news feed consists essentially of text.

In some examples, the artificial intelligence news feed customization model comprises a generative artificial intelligence model.

In some examples, the artificial intelligence news feed customization model comprises a large language model.

In some examples, the applying is performed in real time such that a real-time stream from the output of the multiple news APIs is translated into the new customized news feed in real time.

In some examples, the artificial intelligence preferences model learns user preferences across multiple devices in a house of the client.

In some examples, the multiple news APIs comprise at least three distinct news APIs from different news providers.

In some examples, the artificial intelligence news feed customization model categorizes incoming news content into different genres and the new customized news feed is generated based on a user interest profile that indicates varying levels of interest in different genres.

In some examples, the user interest profile comprises a series of filters and each filter is sized according to a level of interest in a corresponding genre.

In some examples, a size of the pop-up display is adjustable based on a determined level of urgency of the news content.

In some examples, the output of the multiple news APIs is retrieved over the Internet.

In some examples, the new customized news feed comprises a summarized version of a long-form news article.

In some examples, the artificial intelligence preferences model is stored and executed locally on the client device and the artificial intelligence news feed customization model is stored and executed on a remote server operated by the television content provider.

In some examples, the new customized news feed comprises emergency advisories or government announcements.

In some examples, the artificial intelligence preferences model maintains separate preferences for each auxiliary set-top box in a house of the client.

In some examples, the artificial intelligence news feed customization model compresses longer news content into briefer messages for inclusion in the new customized news feed.

In some examples, a non-transitory computer-readable medium has instructions stored thereon that, when executed by at least one physical computing processor, cause a computing device to perform operations comprising: (i) applying, by a television content provider, an artificial intelligence news feed customization model to preferences that a client of the television content provider reveals as indicated by an artificial intelligence preferences model that is monitoring behavior of the client such that a customized news feed is generated based on news content that was extracted from output of multiple news application programming interfaces (APIs) and a new customized news feed is generated that is tailored to the preferences of the client of the television content provider as indicated by the artificial intelligence preferences model and (ii) transmitting, by the television content provider, the new customized news feed to a client device of the client of the television content provider such that a television of the client of the television content provider is enabled to output the new customized news feed as a pop-up display occupying a minority portion of screen space of a display of the television.

In some examples, a system comprises at least one physical computing processor of a computing device and a non-transitory computer-readable medium that has instructions stored thereon that, when executed by the at least one physical computing processor, cause the computing device to perform operations comprising: (i) applying, by a television content provider, an artificial intelligence news feed customization model to preferences that a client of the television content provider reveals as indicated by an artificial intelligence preferences model that is monitoring behavior of the client such that a customized news feed is generated based on news content that was extracted from output of multiple news application programming interfaces (APIs) and a new customized news feed is generated that is tailored to the preferences of the client of the television content provider as indicated by the artificial intelligence preferences model and (ii) transmitting, by the television content provider, the new customized news feed to a client device of the client of the television content provider such that a television of the client of the television content provider is enabled to output the new customized news feed as a pop-up display occupying a minority portion of screen space of a display of the television.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
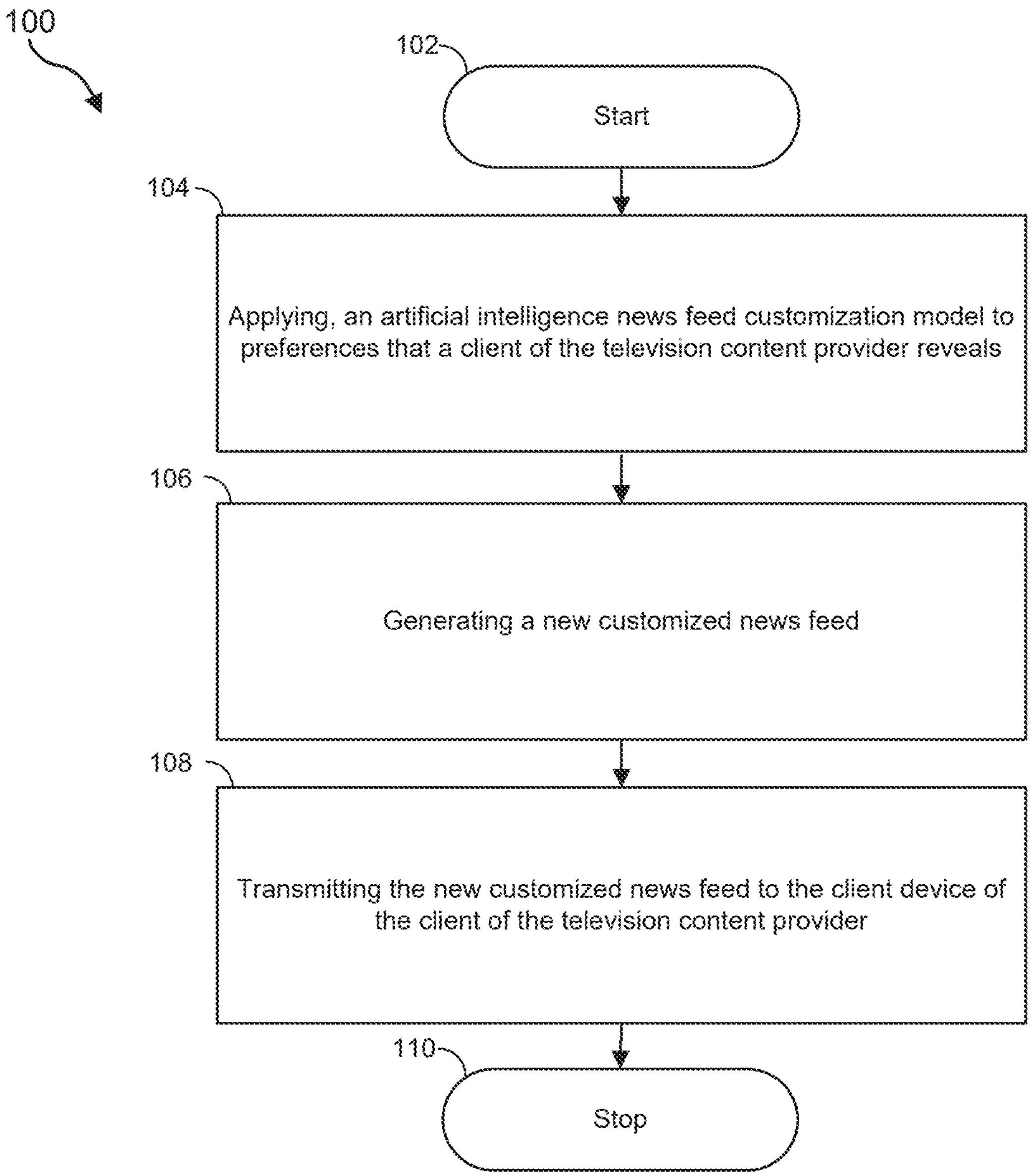
FIG. 1 shows a flow diagram for a method relating to customized news feed generation and delivery on a television display.

FIG. 1 shows a flow diagram for a method 100 relating to cellular coverage acquisition. At step 102, method 100 starts. At step 104, method 100 includes applying, by a television content provider, an artificial intelligence news feed customization model to preferences that a client of the television content provider reveals as indicated by an artificial intelligence preferences model that is monitoring behavior of the client such that a customized news feed is generated based on news content that was extracted from output of multiple news application programming interfaces (APIs) and a new customized news feed is generated that is tailored to the preferences of the client of the television content provider as indicated by the artificial intelligence preferences model. At step 106, method 100 includes generating the new customized news feed to a client device of the client of the television content provider. At step 108, method 100 can include transmitting, by the television content provider, the new customized news feed to the client device of the client of the television content provider such that a television of the client of the television content provider is enabled to output the new customized news feed as a pop-up display occupying a minority portion of screen space of a display of the television. At step 110, method 100 ends.

Figure 2:
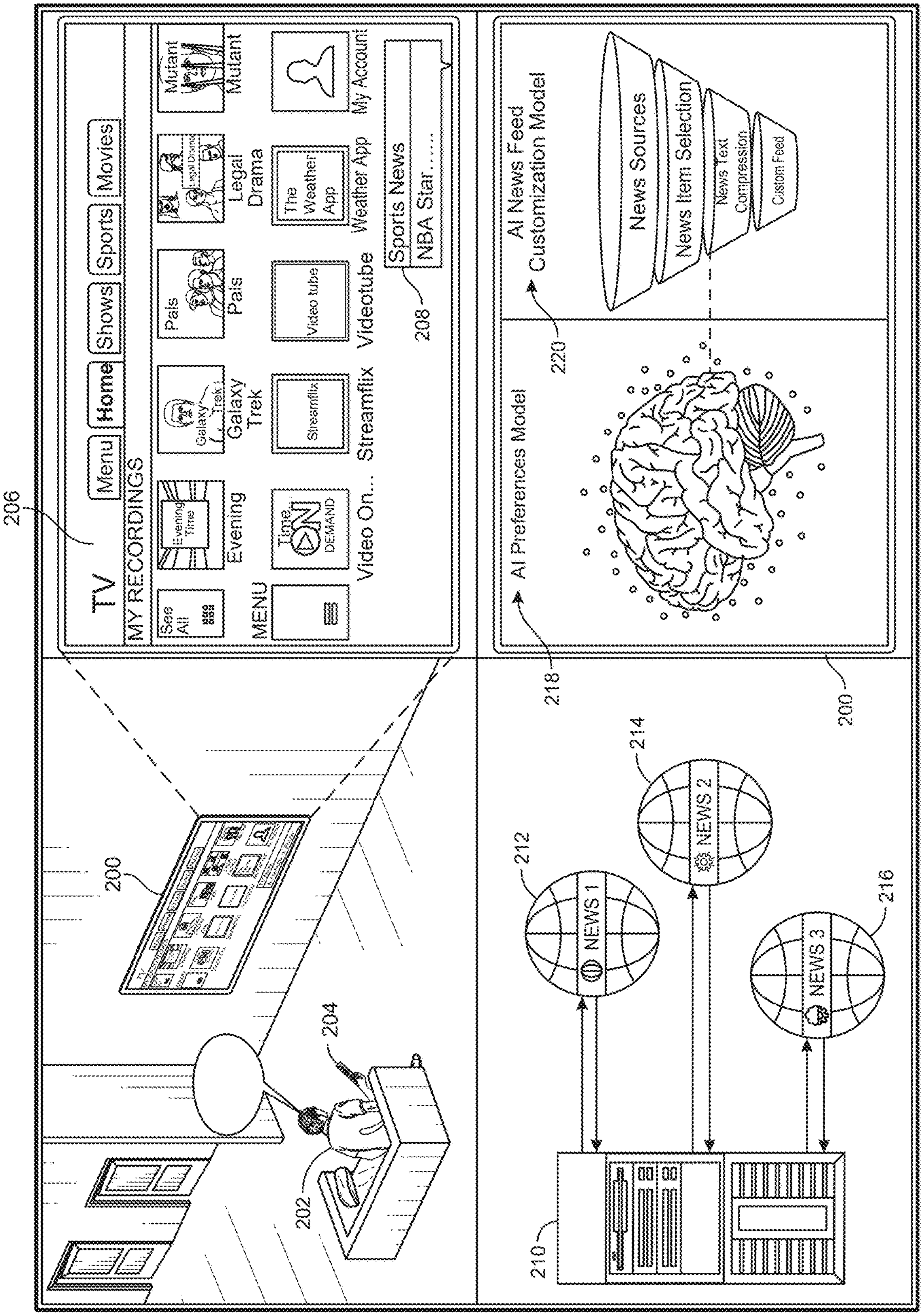
FIG. 2 illustrates a multi-panel representation of an example process for generating and displaying a personalized news feed on a television screen.

FIG. 2 illustrates a multi-panel representation of an example AI-driven news feed customization system for a television content provider. The figure is divided into four distinct panels, each depicting a different aspect of the system's operation. The first panel, positioned in the top-left of the figure, sets the scene in a living room environment. A large flat-screen television 200 is prominently mounted on the wall, serving as the focal point of the room. Seated on a couch in front of the flat-screen television 200 is a person 202, representing a client of the television content provider. The individual is holding a remote control 204, symbolizing their interaction with the TV system.

The second panel, located in the top-right of the figure, offers a detailed close-up view of the television screen 200. This panel helps to demonstrate how the personalized news feed integrates seamlessly into the regular viewing experience. The main content occupies approximately 80% of the screen area. This dominant portion, labeled as main content 206, represents the primary content that the viewer has chosen to watch. In the bottom-right corner of the TV screen, a small but noticeable personalized news feed pop-up window 208 is visible, occupying roughly 20% or less of the screen. This personalized news feed pop-up window 208 may correspond to one helpful feature of the AI-driven news feed customization system, displaying text-based news headlines tailored to the viewer's interests. The size and positioning of this personalized news feed pop-up window 208 is configured in an example embodiment to provide valuable information without significantly disrupting the main content 206.

The personalized news feed pop-up window 208 may be formatted in a variety of ways. The personalized news feed pop-up window 208 on the television screen may take on various forms and formats, offering a highly customizable viewing experience tailored to user preferences and the nature of the content being delivered. The personalized news feed pop-up window 208 may occupy different proportions of the screen, ranging for example from a minimal 1% for subtle, non-intrusive updates, to 2% or 20% for more noticeable alerts, and in cases of critical information or user preference, it may expand to occupy up to 90% or more of the screen.

The content of the personalized news feed pop-up window 208 may be predominantly textual, with options for all-text displays suitable for quick, concise updates, mostly text formats that incorporate small visual elements, or essentially text-based layouts with minimal graphical components. For users who prefer more visual information, the personalized news feed pop-up window 208 may include a majority of text complemented by relevant images, or a balanced mix of text and visual elements. The system may accommodate various multimedia formats, incorporating static images to illustrate news stories, animations to convey dynamic information such as weather patterns or stock market trends, short video clips for breaking news or sports highlights, and interactive multimedia elements that enable users to engage more deeply with the content. The personalized news feed pop-up window's 208 visual style may be customized to match the user's preferences or the television's interface, ranging from sleek, modern designs with clean lines and minimalist fonts to more traditional newspaper-like layouts. It may emulate the appearance of various news tickers seen on broadcast networks, scrolling horizontally along the bottom of the screen, vertically along the side, or appearing as stationary blocks of text that refresh at set intervals. The personalized news feed pop-up window 208 might adopt the look of familiar graphical user interfaces, resembling computer windows with title bars, close buttons, and scroll functions, or it may mimic the style of set-top box messages for a more integrated feel with the television's native interface.

Font styles, sizes, and colors may be adjusted to ensure readability and visual appeal, with options for high-contrast modes for enhanced visibility. The personalized news feed pop-up window 208 may feature different sections for various news categories, using color coding or icons to distinguish between topics like politics, sports, technology, and entertainment. For time-sensitive information, the AI-driven news feed customization system may incorporate flashing elements or dynamic color changes to draw attention to urgent updates. The layout might include collapsible sections, enabling users to expand categories of interest for more detailed information while keeping other topics condensed. Interactive elements may be included, enabling users to use their remote control to navigate through different news items, save stories for later reading, or access additional related content. In some embodiments, the personalized news feed pop-up window 208 adapts its presentation based on the type of content being displayed on the main screen, using more subtle designs during dramatic programming and more noticeable formats during casual viewing. Advanced features might include picture-in-picture capabilities for video news content, real-time language translation for international news, or augmented reality elements that overlay information onto relevant areas of the main screen content. The AI-driven news feed customization system may offer different modes for different times of day, such as a more comprehensive morning briefing versus shorter updates throughout the day. Ultimately, the flexibility of the personalized news feed pop-up window 208 ensures that users may receive personalized news updates in a format that best suits their viewing habits, personal preferences, and the current context of their television experience.

The third panel, situated in the bottom-left of the figure, helps to illustrate background processes that may power the AI-driven news feed customization system. A simplified server rack 210 is depicted, which may represent the technological infrastructure of the television content provider. Server rack 210 may correspond to the central hub of the AI-driven news feed customization system, processing vast amounts of data and orchestrating the personalization process. From server rack 210, multiple arrows extend outward, connecting to various icons that represent different news APIs (Application Programming Interfaces) labeled as 212, 214, and 216. These API icons are creatively illustrated as small globes, each bearing a distinct logo of a news organization. This visual representation effectively conveys the diverse sources from which the AI-driven news feed customization system aggregates news content. The bidirectional nature of the arrows flowing between server rack 210 and the APIs illustrates how, in some examples, there is a dynamic exchange of information. In other words, the AI-driven news feed customization system in some examples not only pulls news content from these sources but may also send data back, such as in the form of usage statistics or content requests. In other examples, the flow of information may be unidirectional from the APIs to server rack 210.

More generally, in some examples the system's ability to aggregate news from diverse sources may help ensure a comprehensive and varied news feed. The AI-driven news feed customization system may tap into a wide array of news sources to provide users with a rich, multifaceted view of current events. Traditional news websites, both mainstream and niche, may be scraped or accessed through RSS feeds, offering a broad spectrum of perspectives and coverage. Radio broadcasts, converted to text through speech-to-text algorithms, may provide real-time updates and local news, particularly valuable for traffic and weather information. Emergency broadcast systems, including those from national and local government agencies, may be integrated to ensure critical alerts are immediately incorporated into the news feed. Cellular networks may be leveraged to receive location-specific news and alerts, especially useful for mobile devices or in areas with limited broadband connectivity. Social media platforms, while requiring careful verification, may offer real-time eyewitness accounts and breaking news. Citizen journalism platforms and community forums may provide hyperlocal news and perspectives often missed by larger outlets. International news agencies and foreign language sources, coupled with real-time translation services, may offer global perspectives and coverage of events worldwide. Specialized industry news services may cater to users with specific professional or personal interests. Academic and research institutions may be sources for scientific and technological news. Podcasts, when transcribed, may offer in-depth analysis and niche content. Video sharing platforms may be sources for visual news content, with AI-powered video analysis extracting key information. Government and NGO press releases may provide official statements and policy updates. Sports leagues and entertainment industry news outlets may cater to users' recreational interests. Financial markets and economic data feeds may supply real-time business and financial news. Weather services and environmental monitoring systems may provide up-to-date climate and environmental news. By aggregating and analyzing information from this diverse array of sources, the AI-driven news feed customization system may create a truly comprehensive and personalized news feed, ensuring users have access to a wide range of information tailored to their specific interests and needs.

The fourth panel, positioned in the bottom-right of the figure, showcases the AI components that may form part of the AI-driven news feed customization system. This panel uses a split-screen effect to visually separate and explain the two AI models that may be involved in the process. On one half of the screen, the AI preferences model 218 is depicted. The AI preferences model 218 is creatively represented as a brain-like structure with numerous data points floating around it, symbolizing the complex patterns and connections that the AI forms to understand user preferences. The visual complexity of this representation underscores the sophisticated nature of the preferences modeling process. On the other half of the panel, the AI news feed customization model 220 is illustrated. This model is portrayed as a funnel, providing a clear visual metaphor for its function. At the top of the funnel, various news sources (e.g., APIs) provide the raw source material for the customization process. As these articles and sources pass through the funnel, they may be processed, filtered, and/or compressed based at least in part on the user's preferences. At the bottom of the funnel, a personalized news feed emerges, tailored to the individual viewer's interests. A dotted line connects these two AI models, 218 and 220, indicating their close interaction and information exchange. This connection visualizes how the preferences learned by one model may directly inform the customization process of the other, resulting in a highly personalized news feed.

In some examples, the AI-driven news feed customization system may operate in real-time. In other words, the AI-driven news feed customization system may generate output at a pace that roughly or exactly matches, or outpaces, the pace of raw incoming news data. In these examples, the AI-driven news feed customization system may also operate instantaneously, or virtually instantaneously, such as operating on the order of seconds or on the order of thousands, hundreds, and/or tenths of a second, such that the output is presented with minimal delay. The AI-driven news feed customization system may apply the AI news feed customization model 220 to incoming news content as it arrives from multiple news application programming interfaces. This real-time processing may help ensure that users receive the most current and relevant information without significant delay. The AI-driven news feed customization system's ability to handle incoming data streams instantaneously is a key feature that may distinguish it from related news aggregation methods.

Real-time application of one or more AI models may involve immediate processing of news content as it becomes available. This technique enables the system to analyze, categorize, and personalize news items on the fly, without batching or queuing content for later analysis. The AI model continuously evaluates incoming news against user preferences, making split-second decisions about relevance and priority. This instantaneous processing is helpful in today's fast-paced news environment, where information may become outdated within minutes or even seconds.

In an example embodiment, to achieve this real-time processing, the AI-driven news feed customization system may employ advanced stream processing architectures capable of handling high-volume, high-velocity news data. These architectures enable for the immediate ingestion and analysis of incoming data streams, enabling the AI model to process news items as they arrive from various sources. The use of in-memory computing techniques further enhances the system's real-time capabilities by minimizing data retrieval latency. By keeping frequently accessed data, such as user preferences and recent news items, in rapid-access memory, the AI-driven news feed customization system may make faster decisions about content relevance and personalization.

Edge computing strategies may also be employed to bring processing closer to the data source, reducing network latency and enabling even faster response times. This technique may involve deploying AI models on edge servers located closer to users or even on the users' devices themselves, enabling near-instantaneous processing of news content. The AI-driven news feed customization system may also utilize parallel processing techniques, distributing the workload across multiple computing resources to simultaneously process numerous news items and user profiles, further reducing overall processing time.

A second potential aspect of real-time functionality in the example AI-driven news feed customization system relates to the translation of the processed news stream into a customized news feed. This real-time translation may help ensure that as soon as news content is processed and personalized by the AI-driven news feed customization system, it may be immediately made available for presentation to the user. The AI-driven news feed customization system maintains a constant flow of information, with newly personalized content seamlessly integrating into the user's news feed without noticeable delay.

This real-time translation capability is crucial for maintaining the relevance and timeliness of the news feed. In breaking news situations, for example, the AI-driven news feed customization system may deliver updates to users almost as quickly as they become available from the source APIs. The real-time translation also enables dynamic adjustment of the news feed based on changing user contexts, such as time of day, current events, or even the user's current activity.

To facilitate this real-time translation, the AI-driven news feed customization system may employ sophisticated queueing and content delivery mechanisms. These mechanisms ensure that personalized news items are transmitted to the user's device as soon as they are generated, maintaining a continuous stream of relevant information. The AI-driven news feed customization system may also use predictive techniques to anticipate user interests and pre-fetch potentially relevant content, further reducing the perceived delay between news availability and delivery.

Figure 3:
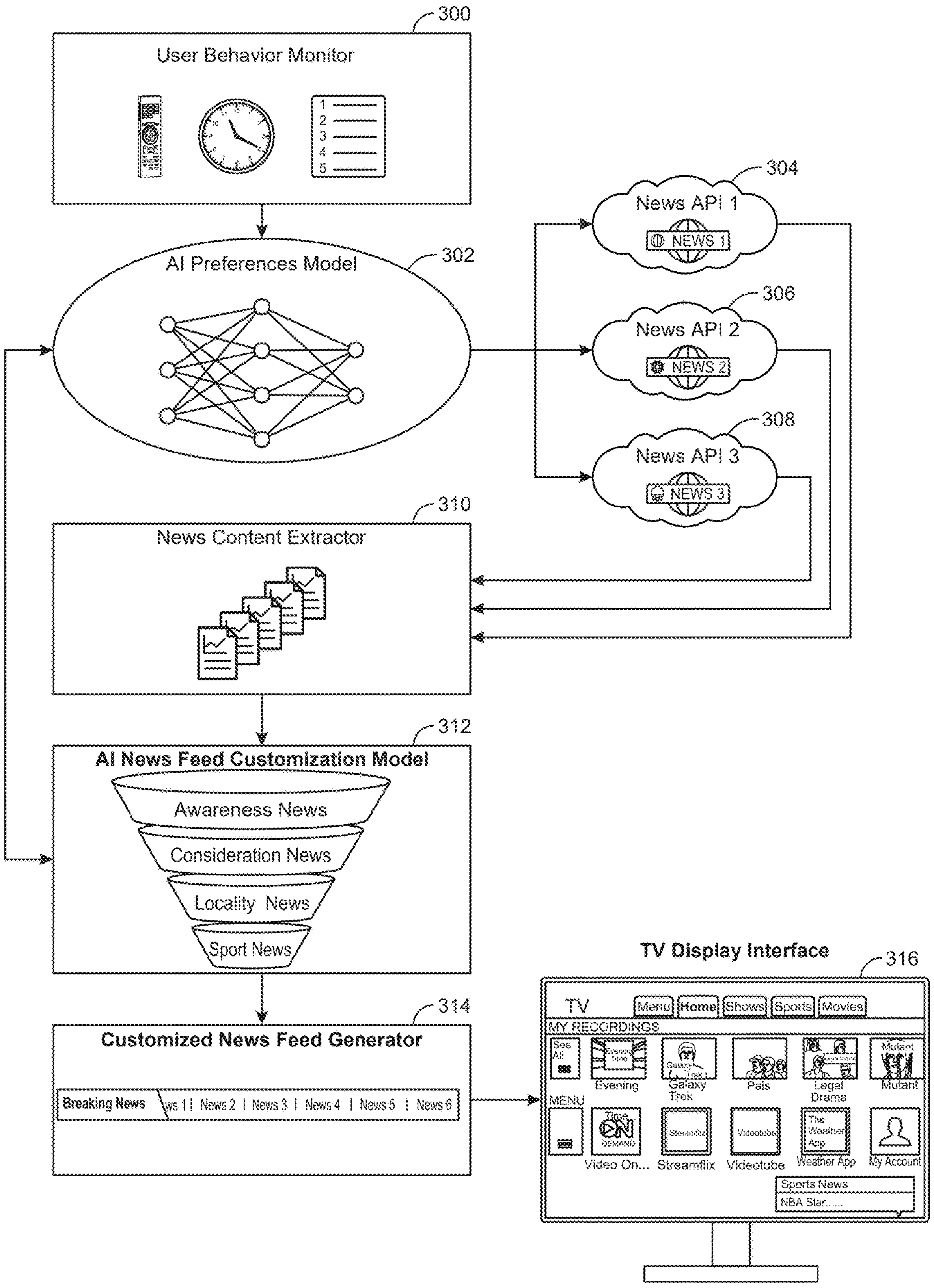
FIG. 3 presents a detailed technical illustration of components and processes involved in an example AI-driven news feed customization system.

FIG. 3 presents a technical diagram illustrating the AI-driven news feed customization system. This flowchart-style illustration provides a comprehensive overview of an example AI-driven news feed customization system's components and their interconnections, demonstrating the flow of data and processes involved in creating a personalized news experience. At the top of the diagram, the User Behavior Monitor 300 is represented by a rectangle, serving as the initial point of data collection in the personalization process. Within this rectangle, various user activities are depicted through small icons, such as a remote control symbolizing channel changes, a clock representing viewing duration, and a list of channel numbers indicating content preferences. These visual elements convey the diverse types of user data that the AI-driven news feed customization system collects and analyzes to understand viewing habits and preferences. The inclusion of these specific icons underscores the multifaceted technique to user behavior monitoring, which may form one helpful component of the personalization process. Additionally, or alternatively, and generally speaking, any other input information regarding user behavior, such as information extracted from a microphone or camera of a television set-top box while monitoring the user behavior, may be leveraged in examples of the AI-driven news feed customization system described in this disclosure, as further discussed below.

Directly below and connected to the User Behavior Monitor 300 is a large oval shape labeled "AI Preferences Model 302". This oval contains a simplified representation of a neural network, with interconnected nodes symbolizing the complex algorithms that process and interpret user behavior data. The connection between the User Behavior Monitor 300 and the AI Preferences Model 302 illustrates the transformation of raw user data into a sophisticated understanding of individual preferences. The neural network representation within the AI Preferences Model 302 suggests the use of advanced machine learning techniques, potentially including deep learning algorithms, to discern patterns and preferences from the collected user behavior data. This visual representation emphasizes the system's capability to adapt and refine its understanding of user preferences over time, potentially leading to increasingly accurate and relevant news feed customization.

To the right of the AI Preferences Model 302, the diagram displays at least three cloud shapes, each representing a different News API (304, 306, 308). These clouds are distinctly labeled (e.g., "News API 1 (304)", "News API 2 (306)", "News API 3 (308)") and feature unique icons or logos, emphasizing the diverse sources from which the AI-driven news feed customization system aggregates news content. This visual representation underscores the AI-driven news feed customization system's ability to access a wide range of information, ensuring comprehensive news coverage. The use of multiple News APIs suggests that the AI-driven news feed customization system may aggregate content from various news providers, potentially including both general news sources and specialized content providers. This diversity in news sources may contribute to a more balanced and comprehensive news feed, catering to a wide range of user interests and preferences. The distinct representation of each News API 304, 306, 308 also implies that the AI-driven news feed customization system may handle different data formats and protocols, showcasing its flexibility and adaptability in content aggregation.

Connected to these News API clouds is a rectangle labeled "News Content Extractor 310". Arrows flow from each News API cloud into this component, illustrating the process of gathering raw news data. Inside the News Content Extractor 310, simplified text documents are shown being filtered or sorted, representing the initial processing of incoming news articles. This component may be understood as performing several functions, potentially including text extraction from various formats, content categorization, and initial relevance filtering. The visual representation of documents being processed within this component suggests that the News Content Extractor 310 may handle large volumes of incoming news data, efficiently preparing it for further analysis and personalization by subsequent components in the system.

Near the center of the diagram is a rectangle labeled "AI News Feed Customization Model 312". This component plays a significant role in the personalization process. Inside this rectangle, a funnel shape is depicted with multiple inputs at the top, representing the influx of various news items. The funnel narrows to a single output at the bottom, symbolizing the distillation of this content into a customized news feed tailored to individual user preferences. This visual metaphor effectively conveys the process of filtering and prioritizing news content based on user preferences and relevance. The AI News Feed Customization Model 312 may be understood as employing advanced algorithms to match extracted news content with user preferences, potentially utilizing techniques such as natural language processing, sentiment analysis, and content recommendation systems to ensure that the most relevant and engaging news items are selected for each user.

Below the AI News Feed Customization Model 312, a rectangle labeled "Customized News Feed Generator 314" is illustrated. This component receives input from the AI Preferences Model 302 above and is depicted with a simplified representation of a news ticker or scrolling text. The Customized News Feed Generator 314 serves as the final stage in the content preparation process, where the selected and personalized news items are formatted for presentation to the user. This module may consider factors such as the display capabilities of the target device, user preferences for news presentation style, and potentially time-sensitive prioritization of news items. The visual representation of a news ticker within this component suggests that the output is designed for seamless integration into the user's viewing experience, providing a continuous stream of relevant information.

At the bottom of the diagram, a simplified TV screen labeled "TV Display Interface 316" is depicted. This screen shows the main content area along with a small pop-up window in one corner, demonstrating how the customized news feed is integrated into the viewer's regular television experience. The TV Display Interface 316 represents the final output of the entire personalization process, where the curated and tailored news content is presented to the user. The pop-up window's size and position illustrate the system's ability to provide personalized news updates without significantly disrupting the primary viewing content. This non-intrusive presentation method enables users to stay informed while enjoying their chosen programming, striking a balance between information delivery and entertainment. The flow of information through the diagram, culminating in the TV Display Interface 316, emphasizes the end-to-end nature of the personalization process. From the initial user behavior monitoring to the final display of customized content, each component plays a specific role in ensuring that the news feed is tailored to the individual user's interests and viewing habits.

Figure 4:
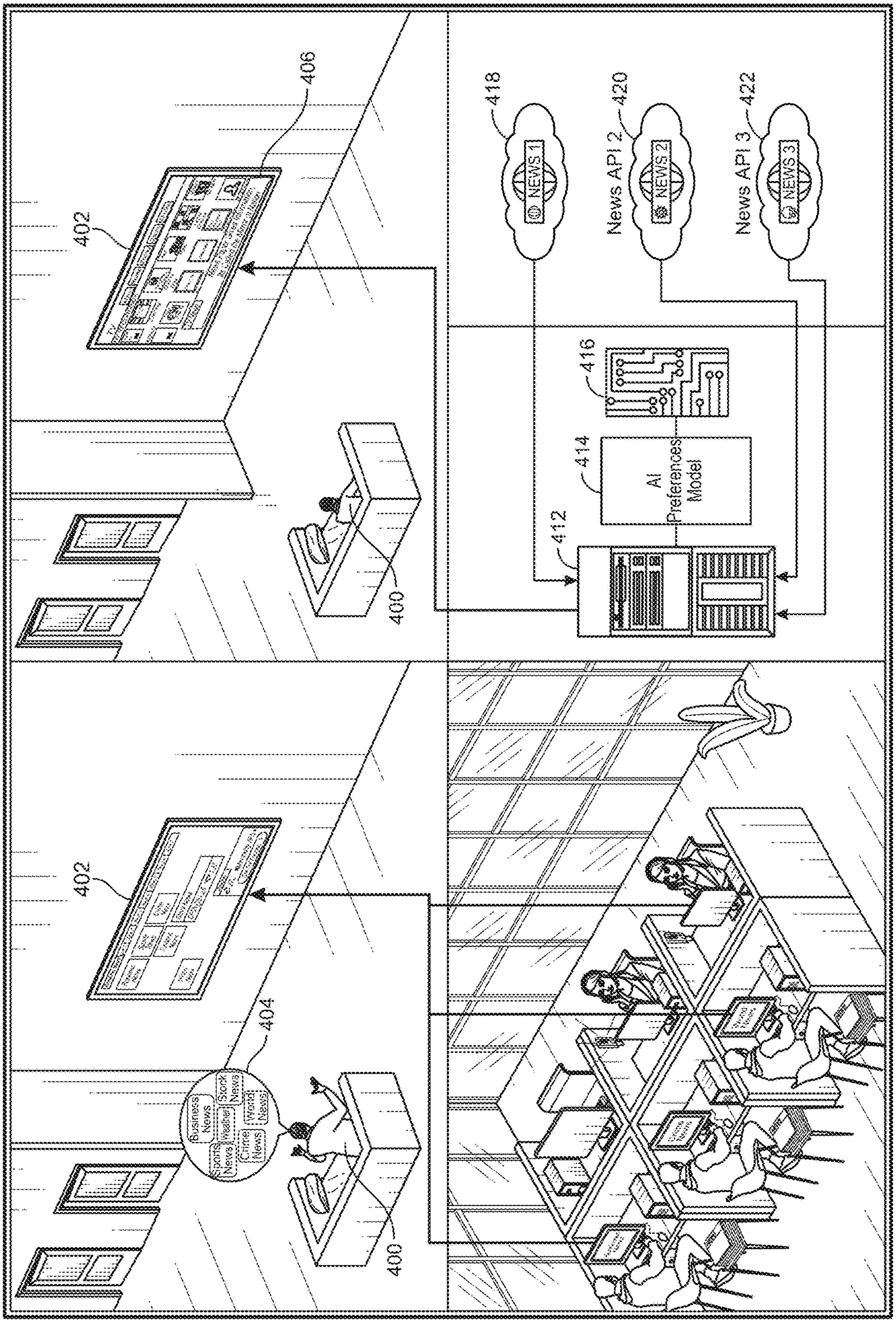
FIG. 4 provides a comparative illustration demonstrating the advantages of an example AI-driven news feed customization system over other news delivery methods on television.

FIG. 4 illustrates a multi-panel representation comparing traditional news consumption with the AI-driven news feed customization system. This figure effectively contrasts the two techniques, highlighting the advantages of the AI-driven news feed customization system in terms of user experience, information relevance, and content delivery efficiency. The top-left panel depicts a scenario of traditional news consumption. In this setting, a person 400 is shown sitting on a couch. The focus of this panel is a large TV 402 displaying a full-screen news broadcast. The TV screen is intentionally cluttered, showing multiple news stories, stock tickers, and weather information competing for the viewer's attention. This visual cacophony represents the information overload often associated with traditional news broadcasts. Above the person's head, a thought bubble 404 is illustrated, containing jumbled icons representing various news topics. These chaotic thought bubble contents further emphasize the cognitive strain experienced by viewers when faced with an undifferentiated deluge of information. This panel effectively conveys the challenges of traditional news consumption, where viewers are often presented with a one-size-fits-all technique that may not align with their individual interests or information needs.

In contrast, the top-right panel presents an example AI-driven news feed customization system experience. The same person 400 is depicted in a similar living room setting, but their demeanor has notably shifted to one of relaxation and engagement. The TV 402 in this panel shows a different technique to news delivery. The main screen displays regular programming, indicating that the viewer's primary content choice is uninterrupted. In one corner of the screen, a small, neat pop-up window 406 is visible, displaying a personalized news feed. The pop-up window 406 contains 2-3 lines of text-based news headlines, demonstrating how the AI-driven news feed customization system may deliver relevant information without overwhelming the viewer or significantly disrupting their viewing experience. The contrast between this panel and the previous one highlights how the AI-driven news feed customization system technique may mitigate information overload while still keeping the viewer informed about topics that matter to them.

The bottom-left panel provides insight into the backend operations of traditional news delivery. It illustrates a bustling newsroom with multiple reporters and editors working frantically. The scene is characterized by stacks of papers, ringing phones, and multiple screens displaying various news stories. This visual representation emphasizes the labor-intensive and potentially chaotic nature of traditional news curation and delivery. Arrows drawn from this newsroom scene to the TV 402 in the first panel represent the unfiltered flow of information from news producers to consumers. This depiction suggests that in related news delivery systems, there is limited customization or filtering of content based on individual viewer preferences, potentially leading to the information overload scenario illustrated in the first panel.

The bottom-right panel, in contrast, showcases the backend of the AI-driven news feed customization system. This panel is divided into two parts. On one side, a simplified server rack 412 represents the example AI-driven news feed customization system, with visual representations of the AI preferences model 414 and AI news feed customization system 416 depicted as interconnected nodes or circuit-like patterns. This representation suggests the sophisticated computational processes involved in personalizing news content. On the other side of this panel, multiple cloud icons 418, 420, 422 represent different news APIs, each adorned with a unique news organization logo. Arrows are drawn from these news API clouds to the AI-driven news feed customization system, and then from the AI-driven news feed customization system to the TV 402 in the second panel. This visual flow illustrates how the example AI-driven news feed customization system aggregates information from diverse sources, processes it through advanced algorithms, and delivers a streamlined, personalized news feed to the viewer. The contrast between this organized, algorithmic technique and the chaotic newsroom scene in the previous panel underscores the efficiency and precision of the AI-driven news feed customization system in delivering relevant news content to individual users.

Figure 5:
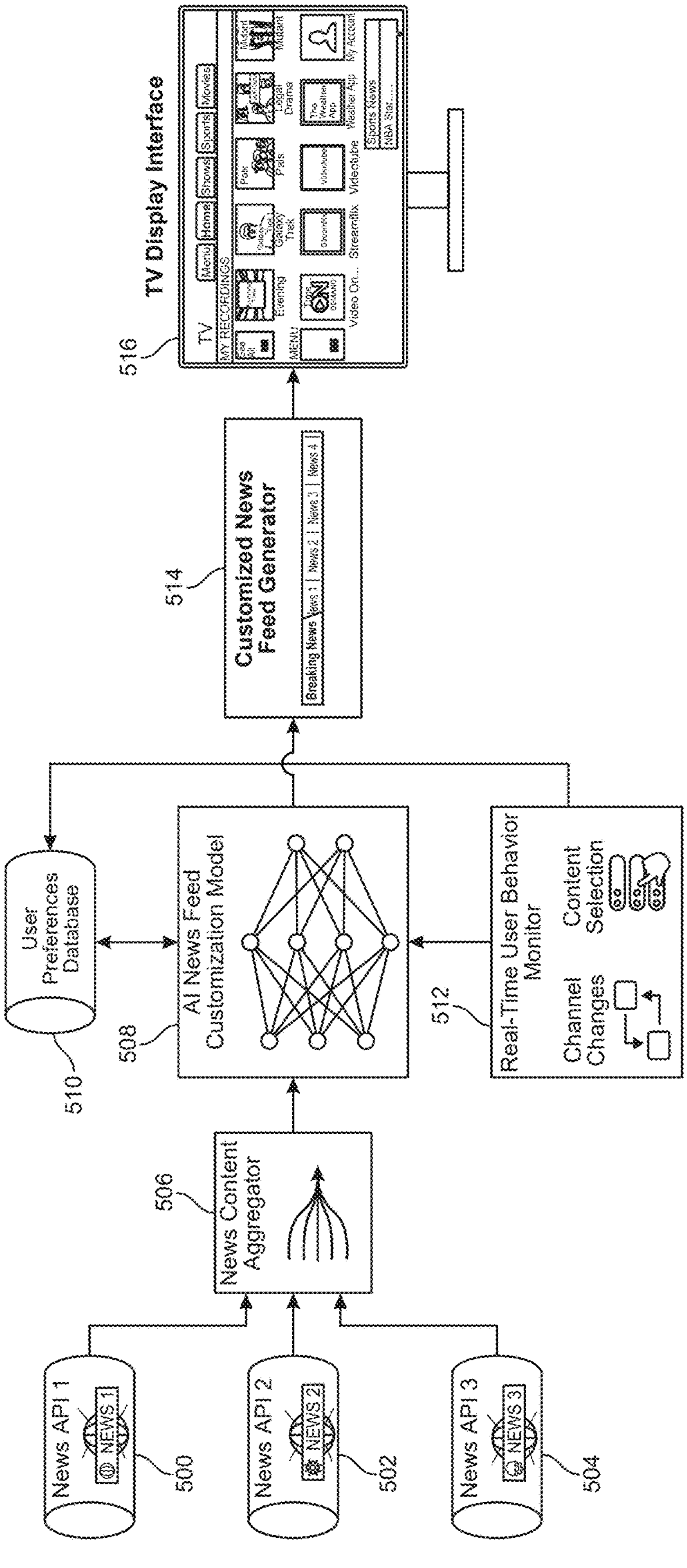
FIG. 5 displays a technical flowchart illustrating an example step-by-step process of extracting, customizing, and delivering personalized news content.

FIG. 5 presents a technical illustration of the real-time news feed customization process, employing a horizontal flowchart-style diagram to depict the continuous and dynamic nature of this example of the system. This diagram effectively visualizes the flow of information from multiple news sources through various processing stages to the final display on the user's television, emphasizing the AI-driven news feed customization system's ability to provide up-to-date, personalized news content.

At the far left of the diagram, three parallel cylinders labeled "News API 1 (500)", "News API 2 (502)", and "News API 3 (504)" represent the real-time news streams that serve as the primary input for the AI-driven news feed customization system. Each cylinder is adorned with a small, unique news organization logo, visually distinguishing the different sources. Arrows emerge from these cylinders, symbolizing the continuous flow of data from these APIs. This representation underscores the AI-driven news feed customization system's capacity to aggregate news from multiple, diverse sources simultaneously, ensuring a comprehensive and varied news feed. The use of multiple APIs suggests that the AI-driven news feed customization system may handle different data formats and protocols, adapting to various news providers' output styles. This diversity in news sources may contribute to a more balanced and comprehensive news feed, potentially catering to a wide range of user interests and preferences.

Adjacent to the cloud icons 418, 420, 422, a rectangle labeled "News Content Aggregator 506" is depicted. This component serves as the initial processing point for the incoming news data. Inside this rectangle, converging arrows or data streams are shown, representing the consolidation of news from the multiple sources. The News Content Aggregator 506 may be understood as performing several functions, potentially including data normalization, duplicate removal, and initial categorization of incoming news items. This centralized aggregation enables efficient processing of large volumes of news data from diverse sources, preparing it for subsequent analysis and personalization.

The center of the diagram features a large, prominent rectangle labeled "AI News Feed Customization Model 508". This component plays a significant role in the personalization process. Inside this rectangle, a simplified representation of a neural network or machine learning model is illustrated, with nodes and connections symbolizing the complex algorithms at work. This visual representation suggests the use of advanced artificial intelligence (AI) techniques, potentially including deep learning and natural language processing, to analyze and categorize news content. The AI News Feed Customization Model 508 may be understood, in some scenarios, as the core engine that matches incoming news items with user preferences, determining the relevance and priority of each piece of content for individual users.

Above the AI News Feed Customization Model 508, a cylinder labeled "User Preference Database 510" is shown. A bidirectional arrow connects this database to the AI News Feed Customization Model 508, indicating a continuous exchange of data. This representation emphasizes the AI-driven news feed customization system's ability to dynamically update and refine its understanding of user preferences based on ongoing interactions and feedback. The User Preference Database 510 may contain detailed profiles of individual users' interests, viewing habits, and content engagement patterns, serving as an input for the personalization process.

Below the AI News Feed Customization Model 508, a rectangle labeled "Real-Time User Behavior Monitor 512" is depicted. This component includes small icons representing different user activities, such as channel changes and content selection. The Real-Time User Behavior Monitor 512 captures and analyzes user interactions in real-time, providing immediate feedback to the AI-driven news feed customization model 508 and User Preference Database 510. This continuous monitoring enables the system to adapt quickly to changing user interests or viewing contexts, ensuring that the personalized news feed remains relevant and engaging.

To the right of the AI News Feed Customization Model 508, a rectangle labeled "Customized News Feed Generator 514" is illustrated. This component receives input from the AI News Feed Customization Model 508 and is depicted with a simplified representation of a news ticker being created. The Customized News Feed Generator 514 likely formats the selected news items for display, potentially considering factors such as screen size, user reading speed, and preferred presentation style.

At the far right of the diagram, a simplified TV screen labeled "TV Display Interface 516" is shown. This screen displays the main content area along with a small pop-up window in one corner, demonstrating how the AI-driven news feed customization system is integrated into the viewer's regular television experience. The TV Display Interface 516 represents the final output of the AI-driven news feed customization system, where the personalized news content is presented to the user in a non-intrusive manner.

Figure 6:
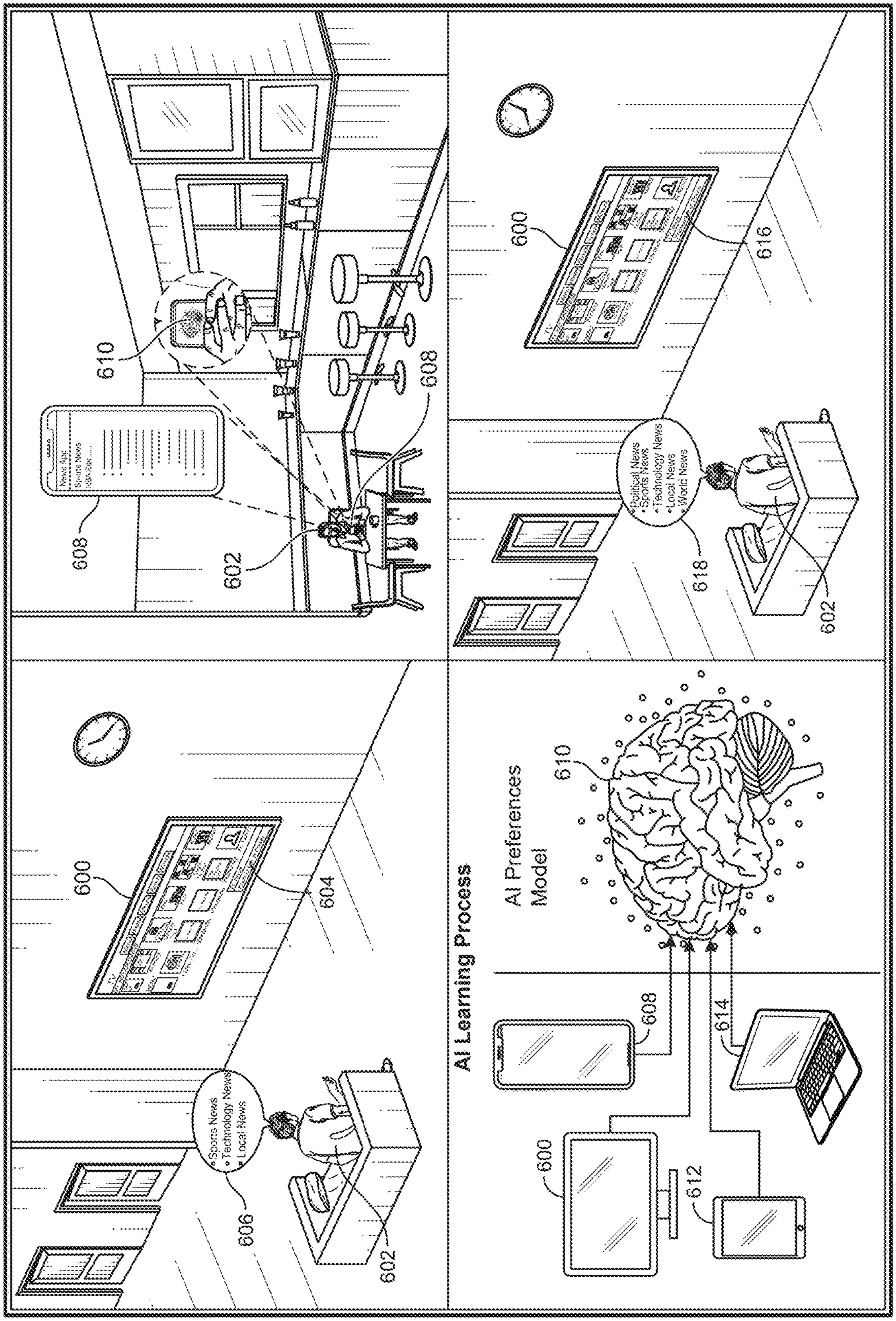
FIG. 6 presents a multi-panel illustration focusing on the role of user preference data in tailoring the news feed content in some examples.

FIG. 6 illustrates a multi-panel representation of how the AI Preferences Model learns and adapts to user behavior across multiple devices, demonstrating the system's ability to create a unified and evolving understanding of the user's interests. This figure effectively showcases how examples of the AI-driven news feed customization system have a capacity to gather data from various sources, process this information through one or more AI models, and deliver consistently personalized news content regardless of the device being used.

The top-left panel depicts a home TV viewing scenario. A large smart TV 600 is mounted on the wall, serving as the focal point of a living room setting. A person 602 is shown sitting on a couch, engaged in watching the TV. The TV screen displays regular content, but notably includes a small news pop-up 604 in one corner. Pop-up 604 represents the personalized news feed, seamlessly integrated into the viewing experience without significantly disrupting the main content. Above the person's head, a thought bubble 606 is illustrated, containing indicators of current interests. These might include sports, technology, and local news, providing a visual representation of the user's current preference profile. This panel establishes the baseline for the user's viewing habits and interests in the home environment, which serves as a primary data source for the AI preference model 610.

The top-right panel transitions to a mobile device usage scenario, showcasing the AI-driven news feed customization system's cross-device functionality. The same person 602 is depicted in a different setting, such as a coffee shop, using a smartphone 608. The phone's screen displays a news app interface, with content categories visibly similar to those shown in the TV pop-up 604 from the previous panel. This visual similarity emphasizes the consistency of the personalized news feed across different devices. Behind the phone, a faint, ghosted image of the AI preference model 610 is illustrated. This subtle representation suggests the continuous operation of the AI preferences model across various devices and contexts, constantly learning and adapting to the user's behavior.

The bottom-left panel provides insight into the AI learning process. This panel employs a split-screen effect to illustrate the relationship between user devices and the AI preference model 610. On one side, simplified representations of various devices are shown: the TV 600, smartphone 608, tablet 612, and laptop 614. This array of devices underscores the AI-driven news feed customization system's ability to collect and synthesize data from multiple sources. On the other side of the split-screen, the AI preference model 610 is depicted as a brain-like structure with interconnected data points and connections. Arrows flow from each device to the AI preferences model 610, representing the continuous stream of user behavior data being processed and integrated into the model. This visual representation emphasizes the AI's capability to create a comprehensive user profile by aggregating data from diverse interactions across different devices and contexts.

The bottom-right panel returns to the living room setting with the TV 600, but now showcases the adaptive nature of the news presentation. The news pop-up 616 on the TV screen displays content that reflects evolved user interests, demonstrating how the AI-driven news feed customization system has learned and adapted over time. The thought bubble 618 above the person now contains a mix of previous and new interests, visually representing the evolution of the user's preferences. This panel effectively illustrates how the AI preference model 610 continuously refines its understanding of the user's interests, ensuring that the delivered news content remains relevant and engaging as the user's preferences change over time.

More generally, in some examples the AI preference model 610 learns user preferences across multiple devices in a house of the client through a sophisticated process of data aggregation, analysis, and continuous refinement. This multi-device learning technique enables the AI-driven news feed customization system to build a comprehensive understanding of the user's interests and behaviors by collecting and synthesizing information from various sources such as smart TVs, smartphones, tablets, and computers within the home environment. The AI preferences model 610 employs advanced machine learning techniques, potentially including collaborative filtering, content-based filtering, and hybrid technique, to identify patterns and correlations in user interactions across these devices. It may utilize techniques like federated learning to maintain user privacy while still benefiting from aggregated insights across multiple devices. AI preferences model 610 may track viewing habits on smart TVs, article click-throughs on mobile devices, search queries on computers, and app usage patterns on tablets, creating a holistic profile of the user's information consumption behaviors. By analyzing the content consumed on each device, the time spent on different types of media, and the context of usage (e.g., time of day, day of week), AI preferences model 610 may infer deeper insights into user preferences that may not be apparent from single-device data alone. The AI-driven news feed customization system may employ transfer learning techniques to apply knowledge gained from one device to improve personalization on others, which may help to ensure a consistent and refined user experience across all platforms. Real-time updating mechanisms enable AI preferences model 610 to quickly adapt to changing interests or preferences detected on any device, reflecting these changes across the entire ecosystem of the user's devices. The multi-device learning capability also enables the AI-driven news feed customization system to distinguish between individual users within the household, potentially through a combination of explicit user profiles and implicit behavior-based differentiation. This cross-device learning technique not only enhances the accuracy and relevance of the personalized news feed but also provides a more seamless and coherent information discovery experience for the user, regardless of which device they are using at any given time.

In one embodiment, AI preference model 610 may be stored and executed locally on the client device while the AI news feed customization model is stored and executed on a remote server operated by the television content provider. This particular arrangement offers benefits such as privacy protection for user preference data and reduced latency for preference-based decisions, while leveraging the substantial computational resources of the provider's servers for the more intensive task of news feed customization. However, as described in this disclosure, various examples of the AI-driven news feed customization system enable for considerable flexibility in the distribution of one or more AI models across various devices and locations, enabling a wide range of alternative implementations to suit different operational requirements, user preferences, and technological constraints.

For instance, both AI models may be fully implemented on the provider's servers, enabling for centralized management and updates while potentially sacrificing some personalization speed and privacy. Conversely, both models may be stored and executed entirely on the client device, such as an advanced set-top box or smart TV, offering maximum privacy and offline functionality at the cost of increased local resource usage. In a hybrid technique, simplified versions of both AI models might run on the client device for basic functionality, with more complex processing offloaded to the provider's servers as needed. AI preference model 610 may be distributed across multiple devices within a household, with each device maintaining a local instance that synchronizes with a master AI model, either on a home server or in the cloud. The AI news feed customization model may be partially implemented on edge servers closer to the user, reducing latency while still leveraging centralized data and processing power. In mobile scenarios, a lightweight version of both AI models might run on a smartphone or tablet, with more intensive tasks delegated to the user's home set-top box or the provider's servers. For users with high-end home entertainment systems, a dedicated media server may host both AI models, offering a balance of performance and privacy. In corporate or institutional settings, the AI models may be implemented on local network servers, enabling for customized news feeds that respect organizational policies and interests. The AI-driven news feed customization system may also adapt dynamically, shifting the execution of AI models between devices based on available resources, network conditions, and user activity. Future implementations might leverage distributed computing techniques, spreading the computational load across a network of user devices while maintaining data privacy. Additionally, the AI-driven news feed customization system may offer users granular control over where different components of the AI models are executed, enabling them to balance performance, privacy, and functionality according to their preferences. This flexibility in implementation not only accommodates a wide range of hardware capabilities and network environments but also future-proofs the AI-driven news feed customization system against evolving technologies and user expectations, helping to ensure that the personalized news feed may be optimally delivered across a diverse ecosystem of devices and infrastructures.

Figure 7:
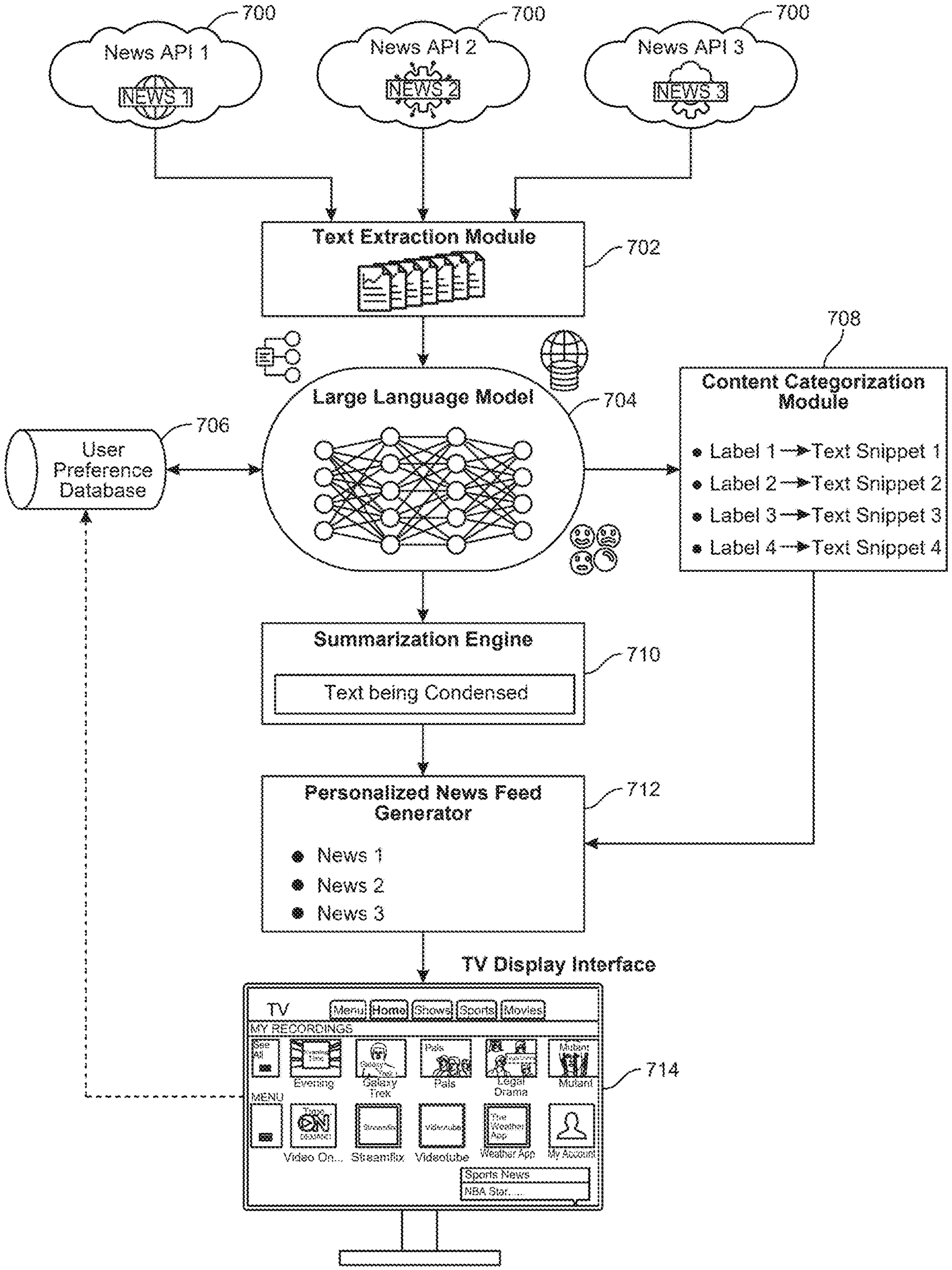
FIG. 7 shows a detailed technical illustration of an example real-time news feed update process using multiple APIs.

FIG. 7 presents a detailed technical diagram illustrating the integration of a large language model (LLM) in an example of the AI-driven news feed customization process. This vertical flowchart-style diagram demonstrates the sophisticated data processing and content personalization capabilities of the AI-driven news feed customization system, emphasizing the central role of the LLM in understanding, categorizing, and tailoring news content for individual users.

At the top of the diagram, three cloud shapes labeled "News API 1", "News API 2", and "News API 3" collectively represent the News Content Input 700. Each cloud is adorned with a distinct icon or logo, visually differentiating the various news sources. This representation underscores the system's ability to aggregate content from multiple, diverse news providers, ensuring a comprehensive and varied pool of information. The use of cloud shapes indicates the digital, and potentially cloud-based nature of these news sources, thereby further indicating real-time access to current news data.

Directly below the News Content Input 700, a rectangle labeled "Text Extraction Module 702" is depicted. Within this module, simplified text documents are shown being processed. This component serves as the initial stage of content analysis, where raw news data from various sources is converted into a standardized format for further processing. The Text Extraction Module 702 may perform functions such as removing HTML tags, extracting relevant text from different file formats, and conducting initial language detection or encoding normalization.

The diagram also features a rectangle labeled "Large Language Model 704". Inside this shape, a complex network of interconnected nodes is illustrated, representing the neural network structure of the LLM. This visual representation emphasizes the sophisticated nature of the language model, capable of understanding context, semantics, and nuances in natural language. In this example, the LLM 704 serves as the core processing unit for news content, leveraging advanced natural language processing techniques to analyze, categorize, and interpret the extracted text from various news sources.

To the left of the Large Language Model 704, a cylinder labeled "User Preference Database 706" is shown. Bidirectional arrows connect this database to the LLM, indicating a continuous exchange of information. This database may contain detailed profiles of individual users' interests, reading habits, and content engagement patterns. The bidirectional connection suggests that the LLM not only uses this data to inform its content processing but also contributes to updating and refining user profiles based on ongoing interactions and newly processed content.

On the right side of the Large Language Model 704, a rectangle labeled "Content Categorization Module 708" is depicted. Inside this module, various category labels are shown being assigned to text snippets. This component represents the AI-driven news feed customization system's ability to classify news content into relevant topics or genres, a process informed by both the LLM's understanding of the content and the user preferences. The categorization process is helpful for organizing news items and matching them with user interests effectively.

Below the Large Language Model 704, a rectangle labeled "Summarization Engine 710" is illustrated. This module shows text being condensed into shorter versions, representing the system's capability to create concise, informative summaries of news articles. The Summarization Engine 710 likely employs advanced natural language generation techniques to produce coherent and contextually relevant summaries, tailored to the user's preferences and/or to the display constraints of different devices.

Near the bottom of the diagram, a rectangle labeled "Personalized News Feed Generator 712" is shown. This component compiles a list of tailored news items, representing the final stage of content curation before display. The Personalized News Feed Generator 712 may consider factors such as content relevance, user interests, article recency, and potentially user-specific parameters like preferred news formats or reading time.

At the very bottom of the diagram, a simplified TV screen labeled "TV Display Interface 714" is depicted. This screen shows the main content area and a small pop-up window in one corner displaying the personalized news feed. This final component represents the user-facing output of the entire AI-driven news feed customization system, where the processed and personalized news content is presented to the viewer in an unobtrusive manner.

More generally, the AI models employed in the AI-driven news feed customization system may take various forms, leveraging different architectures and techniques to natural language processing and content customization. Large Language Models (LLMs) form a helpful or notable category of these AI systems, characterized by their ability to understand and generate human-like text based on vast amounts of training data. These models, such as GPT (Generative Pre-trained Transformer) variants, BERT (Bidirectional Encoder Representations from Transformers), and T5 (Text-to-Text Transfer Transformer), utilize transformer architectures that enable them to process and generate text with a deep understanding of context and semantics. LLMs may be fine-tuned for specific tasks such as news content analysis, summarization, and personalization, making them well-suited for the complexities of tailoring news feeds to individual user preferences.

Generative AI models, which overlap with LLMs in many cases, focus on creating new content based on learned patterns and input data. These may include text-generating models like GPT-3 and its successors, as well as models capable of generating or manipulating images, such as DALL-E, Stable Diffusion, or Midjourney. In the context of a news feed system, generative AI may be employed to create concise summaries, generate engaging headlines, or even produce visual content to accompany news stories. Some generative models use Generative Adversarial Networks (GANs), which consist of a generator network creating content and a discriminator network evaluating its authenticity, iteratively improving the quality of the generated output.

Recurrent Neural Networks (RNNs) and their variants, such as Long Short-Term Memory (LSTM) networks and Gated Recurrent Units (GRUs), offer another technique to processing sequential data like text. These models are particularly adept at capturing long-term dependencies in data, making them useful for tasks like sentiment analysis of news articles or predicting user engagement with certain types of content over time. RNNs may be employed in the preferences modeling component of the AI-driven news feed customization system, helping to understand and predict user behavior patterns.

Convolutional Neural Networks (CNNs), traditionally associated with image processing tasks, have also found applications in natural language processing. In a news feed context, CNNs may be used for text classification, entity recognition, or even processing multimodal content that combines text with images or videos. These models excel at identifying local patterns and features, which may be valuable for categorizing news articles or extracting key information from mixed-media content.

Transformer models, which form the basis of many modern LLMs may also be used. Their self-attention mechanism enables them to weigh the importance of different parts of the input data, making them highly effective at understanding context in language. Variants like BERT are particularly useful for tasks such as sentiment analysis and named entity recognition, which may help in categorizing and understanding the content of news articles. Transformer-based models may also be adapted for cross-lingual tasks, potentially enabling the AI-driven news feed customization system to process and present content from multiple languages.

Reinforcement Learning (RL) models present another avenue for personalizing news feeds. These models learn through a process of trial and error, receiving rewards for actions that lead to desired outcomes. In a news recommendation system, RL may be used to optimize content selection over time, learning from user engagement metrics to continuously refine the personalization algorithm. This technique enables the AI-driven news feed customization system to adapt dynamically to changing user preferences and evolving news landscapes.

Ensemble methods, which combine multiple AI models, may be particularly powerful in a news personalization context. By leveraging the strengths of different model types (for example, using a BERT model for initial content understanding, a generative model for summarization, and a reinforcement learning model for final content selection) the AI-driven news feed customization system may achieve more robust and accurate personalization. Ensemble techniques may also help mitigate the weaknesses of individual AI models, leading to more reliable overall performance.

Federated Learning techniques offer a way to train AI models across decentralized devices or servers holding local data samples, without exchanging the data itself. This technique may be valuable in a news personalization system where user privacy is a concern, enabling the model to learn from user interactions without centralizing sensitive personal data. Federated Learning may enable the AI-driven news feed customization system to improve its personalization capabilities while maintaining strong user data protections.

Explainable AI (XAI) models are becoming increasingly important in applications where transparency is crucial. In the context of news personalization, XAI techniques may help users understand why certain articles are being recommended to them, potentially increasing trust in the AI-driven news feed customization system. Models like LIME (Local Interpretable Model-agnostic Explanations) or SHAP (SHapley Additive exPlanations) may provide insights into the decision-making process of the AI, which may be presented to users alongside their personalized news feed.

The preferences model and the customization model in examples of the personalized news feed system may leverage any combination of these AI techniques to create a highly effective and adaptable AI-driven news feed customization system. The preferences model, which may be responsible for understanding and predicting user interests, might employ a combination of RNNs to capture temporal patterns in user behavior, transformer-based models to understand the context and content of articles users engage with, and reinforcement learning to continuously refine its predictions based on user feedback. This model may also incorporate federated learning techniques to protect user privacy while still benefiting from aggregated insights across the user base.

The customization model, tasked with selecting and presenting news content, may utilize large language models for deep content understanding and summarization, generative AI for creating engaging headlines or visual accompaniments, and convolutional neural networks for processing multimodal content. Ensemble methods may be employed to combine these different techniques, with a reinforcement learning meta-model optimizing the weighting of different sub-models based on performance metrics. Explainable AI techniques may be integrated to provide users with insights into why certain articles were selected for them, potentially as an optional feature for users who want to understand the system's decision-making process.

Both models may be designed with flexibility in mind, enabling for easy updates and replacements of individual components as AI technology evolves. For example, the AI-driven news feed customization system may be architected to enable seamless integration of new language models or generative AI capabilities as they become available, ensuring that the personalization capabilities remain state-of-the-art. The modular nature of this technique would also enable for customization based on the specific requirements of different deployment scenarios, such as adapting to varying computational resources or regional content preferences.

Furthermore, the system may employ adaptive learning techniques, dynamically adjusting the complexity and type of AI models used based on factors such as available computing power, user engagement levels, or the characteristics of specific news events. For instance, during breaking news situations, the system might prioritize speed and brevity, leaning more heavily on efficient summarization models, while during periods of normal news flow, it might employ more sophisticated content analysis and personalization techniques.

Figure 8:
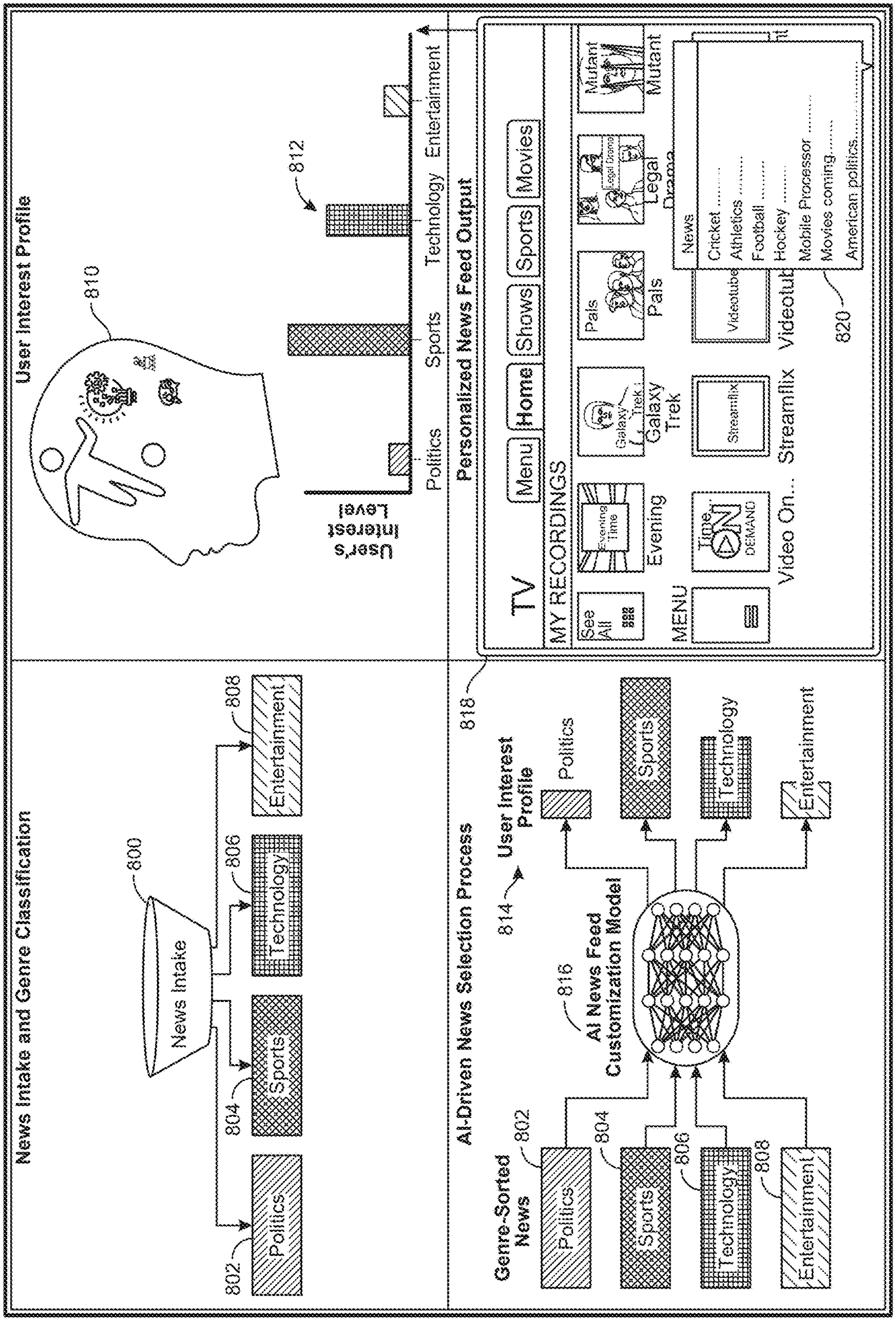
FIG. 8 illustrates a multi-panel representation showcasing how an example system adapts to different user profiles within a household.

FIG. 8 illustrates a multi-panel representation of an example genre-based news sorting and selection process used in creating a personalized news feed. This figure effectively demonstrates how incoming news is classified into different genres, matched against a user's interest profile, and processed by the AI news feed customization model to select the most relevant news items for the user.

The top-left panel depicts the news intake and genre classification process. A funnel labeled "News Intake 800" is prominently displayed at the top of this panel. Various news articles may effectively enter the funnel here. This visual metaphor effectively conveys the idea of a large volume of diverse news content being processed by the system. At the bottom of the funnel, multiple streams flow out, each labeled with a different genre such as "Politics 802", "Sports 804", "Technology 806", and "Entertainment 808". Each genre stream is rendered in a distinct color, establishing a color-coding system that is maintained throughout the figure. This representation illustrates the system's ability to automatically categorize incoming news items into relevant genres, a helpful step in the personalization process.

The top-right panel focuses on the user interest profile. A silhouette of a person's head 810 is shown, filled with various icons representing different interests. These icons are sized differently to represent varying levels of interest, providing a visual hierarchy of the user's preferences. For example, a large sports icon might indicate a strong interest in sports news, while a smaller icon for another category suggests a lower level of interest. Below the silhouette, a bar graph 812 is displayed, representing the user's interest levels in different genres. The colors of these bars correspond to the genre streams from the first panel, maintaining visual consistency and enabling for easy comparison between available content and user interests. This panel effectively illustrates how the system quantifies and represents user preferences, forming the basis for personalized content selection.

The bottom-left panel illustrates the AI-driven news selection process, showing the interaction between the genre-sorted news and the user interest profile. On one side of this panel, simplified versions of the genre streams from the first panel are depicted. On the other side, the user interest profile is represented as a series of filters or gates 814, sized according to the interest levels shown in the second panel. In the center, the AI news feed customization model 816 is illustrated as a complex network of nodes, symbolizing the sophisticated algorithms at work. Arrows are shown going from the genre streams through AI news feed customization model 816 and then through the interest filters. This visual representation effectively conveys how AI news feed customization model 816 processes the categorized news items, weighing them against the user's interests to determine which items should be included in the personalized feed. The inclusion of small "decision points" within AI news feed customization model 816, represented by diamond shapes, further illustrates how the AI-driven news feed customization system decides which news items pass through based on relevance and user interest.

The bottom-right panel shows the personalized news feed output on a TV screen 818. The main content area of the TV is visible, with a pop-up window 820 in one corner displaying a list of news headlines. The distribution of news items in this list reflects the user's interests as shown in the second panel. For instance, if sports was indicated as the largest interest, the majority of the headlines in pop-up window 820 would be sports-related. This panel demonstrates the final product of the personalization process, showing how the selected news items are presented to the user in a non-intrusive manner alongside their regular TV content.

Figure 9:
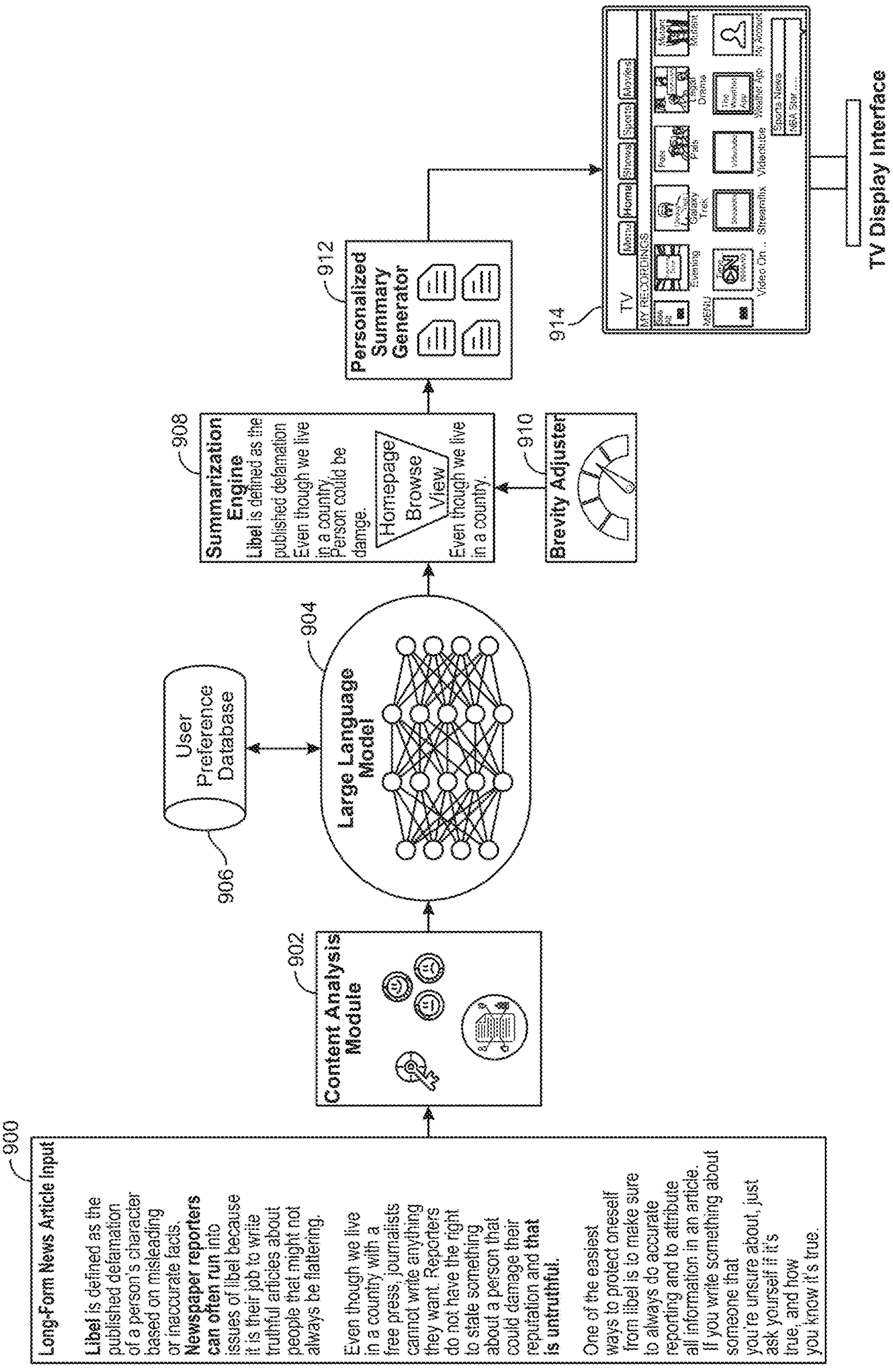
FIG. 9 presents a detailed technical illustration of an example AI news feed customization model in the context of a summarization engine.

FIG. 9 presents a detailed technical illustration of an example compression and summarization process for long-form news content. This horizontal flowchart-style diagram demonstrates the AI-driven news feed customization system's capability to transform extensive news articles into concise, personalized summaries suitable for display on a TV interface. The diagram flows from left to right, emphasizing the transformation of content from long to short form.

On the far left of the diagram, a tall rectangle labeled "Long-Form News Article Input 900" is depicted. This component represents the starting point of the process, where full-length news articles enter the AI-driven news feed customization system. Inside this rectangle, lines of text are shown, with certain key phrases or sentences highlighted. This visual representation suggests that even at this initial stage, the AI-driven news feed customization system begins to identify potentially important elements of the article, laying the groundwork for subsequent processing steps.

Adjacent to the input, a rectangle labeled "Content Analysis Module 902" is illustrated. This module contains icons representing various analysis techniques, potentially including keyword extraction, sentiment analysis, and entity recognition. The Content Analysis Module 902 serves as the initial processing stage, where the raw news content is dissected and its key components are identified. This step is helpful for understanding the structure, main topics, and important details of the article, which will inform the subsequent summarization process.

At the center of the diagram, a large, prominent rounded rectangle labeled "Large Language Model 904" is displayed. Inside this shape, a complex network of interconnected nodes is illustrated, representing the neural network structure of the LLM. This visual representation emphasizes the sophisticated nature of the language model, capable of understanding context, semantics, and nuances in natural language. LLM 904 plays a central role in the compression and summarization process, leveraging its deep understanding of language to identify salient points of the news article and generate coherent summaries.

Above the Large Language Model 904, a cylinder labeled "User Preference Database 906" is shown. Bidirectional arrows connect this database to LLM 904, indicating a bidirectional and/or continuous exchange of information. This component represents the AI-driven news feed customization system's ability to tailor the summarization process to individual user preferences. The database likely contains information about users' reading habits, topic interests, and preferred levels of detail, which LLM 904 may use to guide its summarization technique.

To the right of the Large Language Model 904, a rectangle labeled "Summarization Engine 908" is depicted. Inside this module, a funnel-like graphic is shown with longer text entering and shorter text exiting. This visual metaphor effectively conveys the core function of Summarization Engine 908: condensing lengthy news articles into brief, informative summaries. The engine may employ advanced natural language generation techniques to ensure that the summaries are coherent, contextually relevant, and aligned with user preferences.

Below Summarization Engine 908, a rectangle labeled "Brevity Adjuster 910" is illustrated. This component includes a slider or dial graphic, representing the AI-driven news feed customization system's ability to fine-tune the length of summaries. Brevity Adjuster 910 enables flexibility in summary generation, potentially adapting to different display contexts or user preferences for more or less detailed news updates.

Further to the right, a rectangle labeled "Personalized Summary Generator 912" is shown. This module is depicted with multiple brief text snippets being compiled, representing the final stage of summary creation. Personalized Summary Generator 912 likely combines the output from the Summarization Engine 908 with user-specific considerations to create tailored news briefs that are not only concise but also relevant to individual interests.

On the far right of the diagram, a simplified TV screen labeled "TV Display Interface 914" is illustrated. This screen shows the main content area and a small pop-up window in one corner displaying the brief, personalized news summary. This component represents the final output of the summarization process, demonstrating how the compressed news content is presented to the user in a non-intrusive manner alongside regular TV programming.

Figure 10:
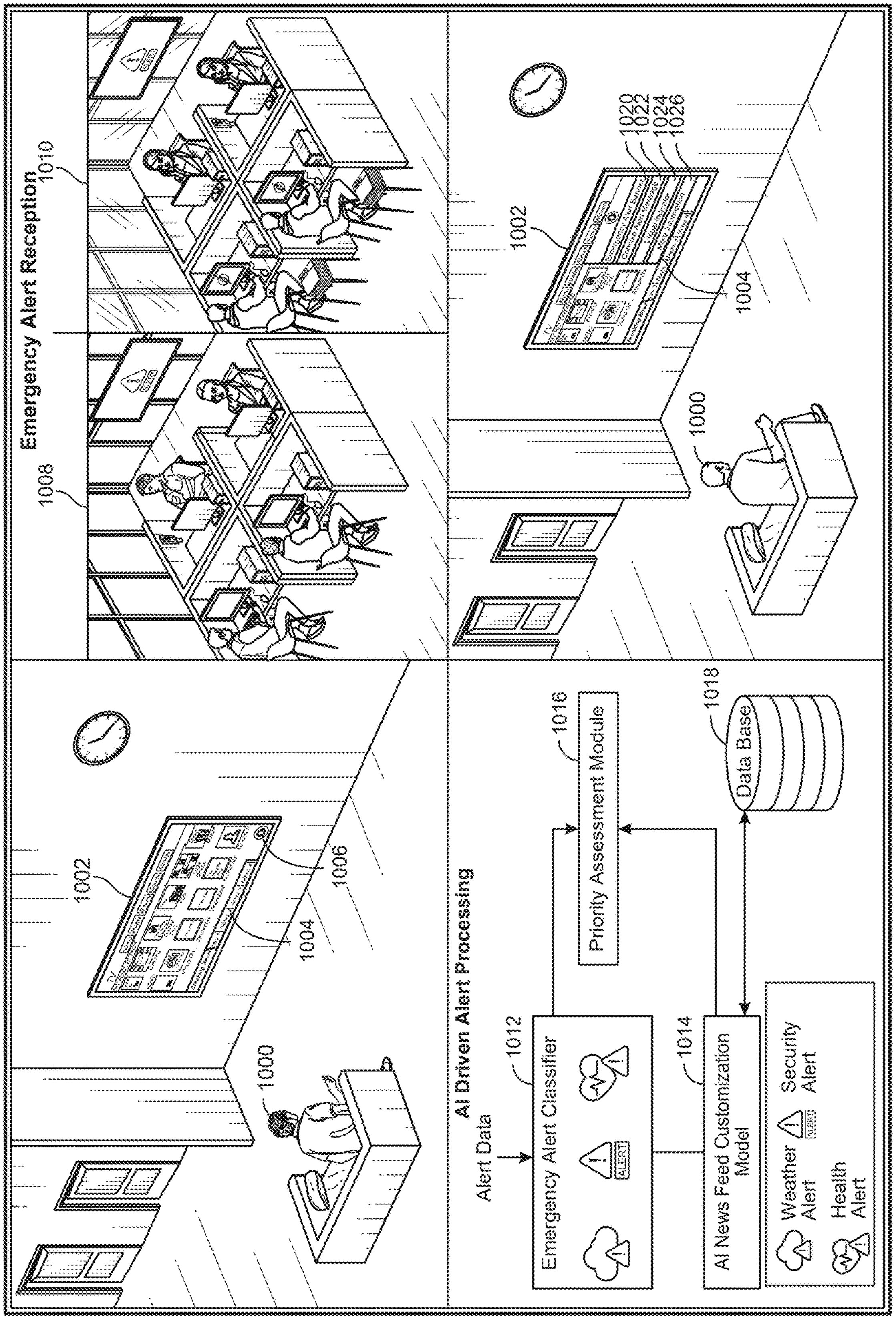
FIG. 10 provides a multi-panel illustration demonstrating an example of a user receiving personalized news updates during regular TV viewing.

FIG. 10 presents a multi-panel illustration demonstrating an example integration of emergency advisories and government announcements into an embodiment of the personalized news feed system. This figure effectively showcases how the system handles urgent alerts, processes them through AI, and displays them on the user's TV in a manner that is both attention-grabbing and non-intrusive.

The top-left panel depicts a normal viewing experience. In this setting, a person 1000 is shown comfortably watching a large TV 1002. The TV screen displays regular programming, with a small news ticker 1004 at the bottom showing non-urgent news items. This representation establishes the baseline viewing scenario, emphasizing the AI-driven news feed customization system's ability to provide news updates without significantly disrupting the primary content. In one corner of the TV screen, a subtle icon 1006 is visible, indicating that the emergency alert system is active but not currently in use. This icon serves as a visual cue that the system is prepared to deliver important notifications when necessary, while remaining unobtrusive during normal operation.

The top-right panel illustrates the emergency alert reception process through a split-screen effect. On one side, a government emergency operations center 1008 is depicted, showing officials at computer stations and a large screen displaying alert information. This representation emphasizes the official source and critical nature of emergency communications. On the other side, the TV content provider's data center 1010 is shown receiving the emergency alert signal. Visual cues such as flashing icons or data streams represent the incoming alert, illustrating the real-time nature of the alert transmission and reception process. This panel effectively demonstrates the system's ability to quickly receive and process official emergency communications from authorized sources.

The bottom-left panel provides insight into AI-driven alert processing. A rectangle labeled "Emergency Alert Classifier 1012" is depicted receiving the alert data, representing the initial stage of processing where the AI-driven news feed customization system categorizes the type and urgency of the alert. This classifier is connected to another rectangle labeled "AI News Feed Customization Model 1014", illustrating how the emergency alert is integrated into the existing AI-driven news feed customization system. Arrows from both the Emergency Alert Classifier 1012 and the AI News Feed Customization Model 1014 point to a "Priority Assessment Module 1016", which determines how and when to display the alert based on its urgency and relevance. A user preference database 1018 is also shown connected to AI News Feed Customization Model 1014, indicating that even in emergency scenarios, the AI-driven news feed customization system considers user preferences to some extent, including potentially preferences regarding how to present the alert or what additional information to include.

The bottom-right panel returns to the living room setting, now showing how the emergency alert is displayed on the TV 1002. The alert is prominently presented, occupying a larger portion of the screen than the regular news ticker, but without completely interrupting the main content. This balance demonstrates the system's ability to convey urgent information while still respecting the viewer's ongoing experience. The person 1000 is depicted as alert and attentive to the message, indicating the effectiveness of the alert display. On the TV screen, several elements of the emergency alert are visible: an emergency alert banner 1020 with an attention-grabbing design, ensuring that the alert is immediately noticeable, a concise alert message 1022 providing key information about the emergency situation, a visual indicator 1024 showing the alert's urgency level, helping viewers quickly assess the immediacy of the situation, and an option for more information 1026, enabling viewers to access additional details if desired.

Figure 11:
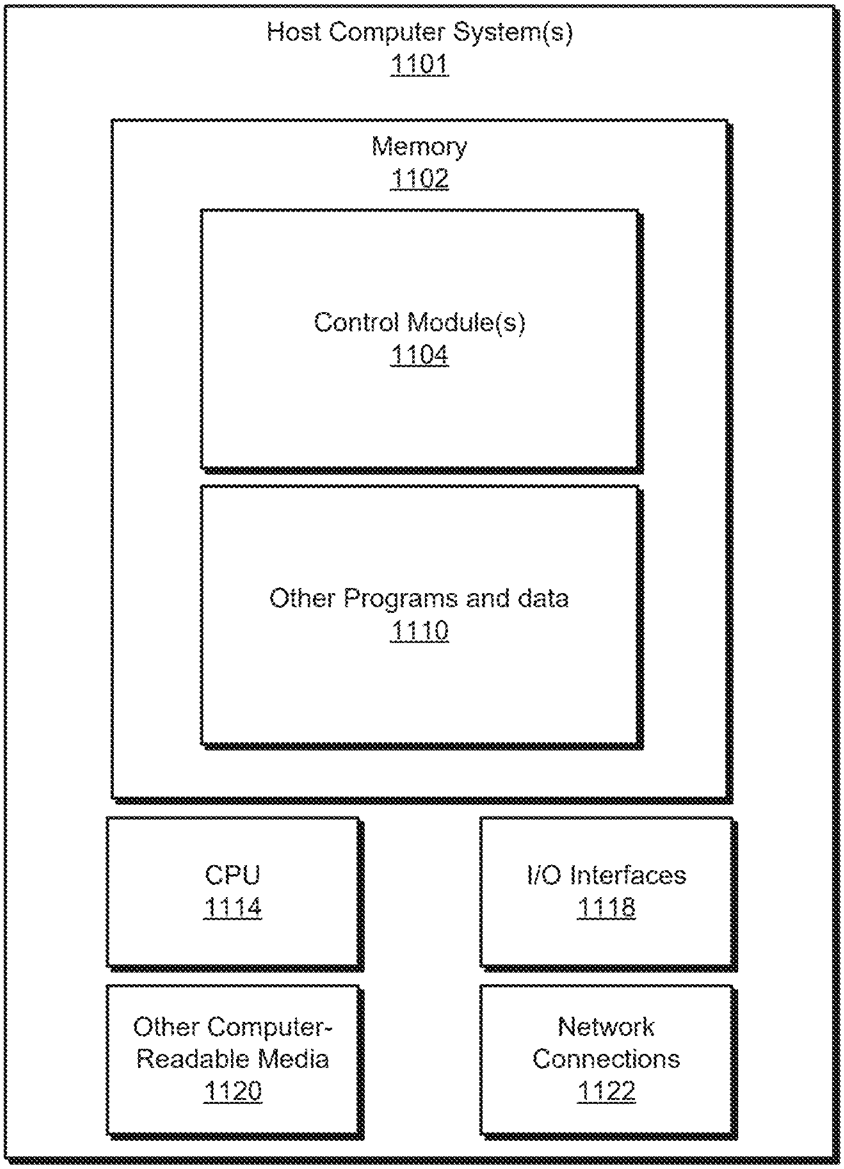
FIG. 11 shows a diagram of an example computing system that may facilitate the performance of one or more of the methods described herein.

FIG. 11 shows a system diagram that describes an example implementation of a computing system(s) for implementing embodiments described herein. The functionality described herein may be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, enabling higher deployment agility and flexibility. However, FIG. 11 illustrates an example of underlying hardware on which such software and functionality may be hosted and/or implemented.

In particular, shown is example host computer system(s) 1101. For example, such computer system(s) 1101 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 1102 may have stored thereon control module(s) 1104. The control module(s) 1104 may be configured to implement and/or perform some or all of the functions of the systems or components described herein. Memory 1102 may also store other programs and data 1110, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include a video interface, other data input or output interfaces, or the like. Other computer-readable media 1120 may include other types of stationary or removable computer-readable media, such as removable flash drives, external hard drives, or the like.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

applying, by a television content provider, an artificial intelligence news feed customization model to preferences that a client of the television content provider reveals as indicated by an artificial intelligence preferences model that is monitoring behavior of the client;

generating, based on applying the artificial intelligence news feed customization model, a new customized news feed using news content that was extracted from output of multiple news application programming interfaces (APIs) such that the new customized news feed is tailored to the preferences of the client of the television content provider as indicated by the artificial intelligence preferences model; and transmitting, by the television content provider, the new customized news feed to a client device of the client of the television content provider such that a television of the client of the television content provider is enabled to output the new customized news feed as a pop-up display occupying a minority portion of screen space of a display of the television;

wherein a predictive technique is applied to anticipate a user interest and pre-fetch content that is relevant to the anticipated user interest.

2. The method of claim 1, wherein generating the new customized news feed comprises performing real-time translation of a processed news stream by dynamically adjusting the processed news stream based on a changing user context.

3. The method of claim 2, wherein the changing user context comprises a time of day or a current user activity.

4. The method of claim 1, wherein the new customized news feed is made available for presentation in immediate response to generation of the new customized news feed.

5. The method of claim 1, wherein the applying is performed in real time such that a real-time stream from the output of the multiple news APIs is translated into the new customized news feed in real time.

6. The method of claim 1, wherein applying the predictive technique reduces a perceived delay between news availability and delivery.

7. The method of claim 1, wherein the multiple news APIs comprise at least three distinct news APIs from different news providers.

8. The method of claim 1, wherein:

the artificial intelligence news feed customization model categorizes incoming news content into different genres; and the new customized news feed is generated based on a user interest profile that indicates varying levels of interest in different genres.

9. The method of claim 8, wherein the user interest profile comprises a series of filters and each filter is sized according to a user's level of interest in a corresponding genre.

10. The method of claim 1, wherein a size of the pop-up display is adjustable based on a determined level of urgency of the news content.

11. The method of claim 1, wherein the output of the multiple news APIs is retrieved over the Internet.

12. The method of claim 1, wherein the new customized news feed comprises a summarized version of a long-form news article.

13. The method of claim 1, wherein:

the artificial intelligence preferences model is stored and executed locally on the client device; and the artificial intelligence news feed customization model is stored and executed on a remote server operated by the television content provider.

14. The method of claim 1, wherein the new customized news feed comprises emergency advisories or government announcements.

15. The method of claim 1, wherein the artificial intelligence preferences model maintains separate preferences for each auxiliary set-top box in a house of the client.

16. The method of claim 1, wherein the artificial intelligence news feed customization model compresses longer news content into briefer messages for inclusion in the new customized news feed.

17. A non-transitory computer-readable medium that has instructions stored thereon that, when executed by at least one physical computing processor, cause a computing device to perform operations comprising:

applying, by a television content provider, an artificial intelligence news feed customization model to preferences that a client of the television content provider reveals as indicated by an artificial intelligence preferences model that is monitoring behavior of the client;

generating, based on applying the artificial intelligence news feed customization model, a new customized news feed using news content that was extracted from output of multiple news application programming interfaces (APIs) such that the new customized news feed is tailored to the preferences of the client of the television content provider as indicated by the artificial intelligence preferences model; and transmitting, by the television content provider, the new customized news feed to a client device of the client of the television content provider such that a television of the client of the television content provider is enabled to output the new customized news feed as a pop-up display occupying a minority portion of screen space of a display of the television;

wherein the operations are configured such that a predictive technique is applied to anticipate a user interest and pre-fetch content that is relevant to the anticipated user interest.

18. The non-transitory computer-readable medium of claim 17, wherein the new customized news feed consists essentially of text.

19. A system comprising:

at least one physical computing processor of a computing device; and a non-transitory computer-readable medium that has instructions stored thereon that, when executed by the at least one physical computing processor, cause the computing device to perform operations comprising:

applying, by a television content provider, an artificial intelligence news feed customization model to preferences that a client of the television content provider reveals as indicated by an artificial intelligence preferences model that is monitoring behavior of the client;

generating, based on applying the artificial intelligence news feed customization model, a new customized news feed using news content that was extracted from output of multiple news application programming interfaces (APIs) such that the new customized news feed is tailored to the preferences of the client of the television content provider as indicated by the artificial intelligence preferences model; and transmitting, by the television content provider, the new customized news feed to a client device of the client of the television content provider such that a television of the client of the television content provider is enabled to output the new customized news feed as a pop-up display occupying a minority portion of screen space of a display of the television;

wherein the operations are configured such that a predictive technique is applied to anticipate a user interest and pre-fetch content that is relevant to the anticipated user interest.

20. The system of claim 19, wherein the new customized news feed consists essentially of text.

* * * * *